(12) United States Patent
Montoya

(10) Patent No.: US 11,035,206 B2
(45) Date of Patent: Jun. 15, 2021

(54) DOWNHOLE ON-DEMAND EXTENDED-LIFE POWER SOURCE SYSTEM

(71) Applicant: Chevron U.S.A. Inc., San Ramon, CA (US)

(72) Inventor: James Daniel Montoya, Santa Fe, NM (US)

(73) Assignee: CHEVRON U.S.A. INC., San Ramon, CA (US)

( * ) Notice: Subject to any disclaimer, the term of this patent is extended or adjusted under 35 U.S.C. 154(b) by 151 days.

(21) Appl. No.: 16/382,703

(22) Filed: Apr. 12, 2019

(65) Prior Publication Data

US 2019/0316446 A1 Oct. 17, 2019

Related U.S. Application Data

(60) Provisional application No. 62/656,569, filed on Apr. 12, 2018.

(51) Int. Cl.
*E21B 41/00* (2006.01)
*H01M 10/48* (2006.01)
*E21B 47/017* (2012.01)

(52) U.S. Cl.
CPC ........ *E21B 41/0085* (2013.01); *E21B 47/017* (2020.05); *H01M 10/482* (2013.01)

(58) Field of Classification Search
CPC .................................................. E21B 41/0085
See application file for complete search history.

(56) References Cited

U.S. PATENT DOCUMENTS

| 8,975,861 | B2 | 3/2015 | Teodorescu et al. | |
| 2013/0229142 | A1* | 9/2013 | Teodorescu | H02J 7/342 320/103 |
| 2018/0017703 | A1* | 1/2018 | Lee | G01T 1/2018 |
| 2018/0363425 | A1* | 12/2018 | Burky | E21B 41/0007 |
| 2020/0149372 | A1* | 5/2020 | Hunter | H01M 6/5011 |

FOREIGN PATENT DOCUMENTS

WO  WO 2018/229496  12/2018

* cited by examiner

*Primary Examiner* — Giovanna Wright
(74) *Attorney, Agent, or Firm* — King & Spalding LLP

(57) ABSTRACT

A downhole on-demand power source system can include at least one first energy storage device located within a wellbore disposed in a subterranean formation in a first inactive state. The system can also include at least one first trigger that initiates the at least one first energy storage device from the first inactive state to a first active state. The at least one first energy storage device, once initiated, can provide a first power to an electrical load disposed in the wellbore proximate to the at least one first energy storage device. The at least one first energy storage device, when in the first inactive state, is incapable of providing the first power.

17 Claims, 18 Drawing Sheets

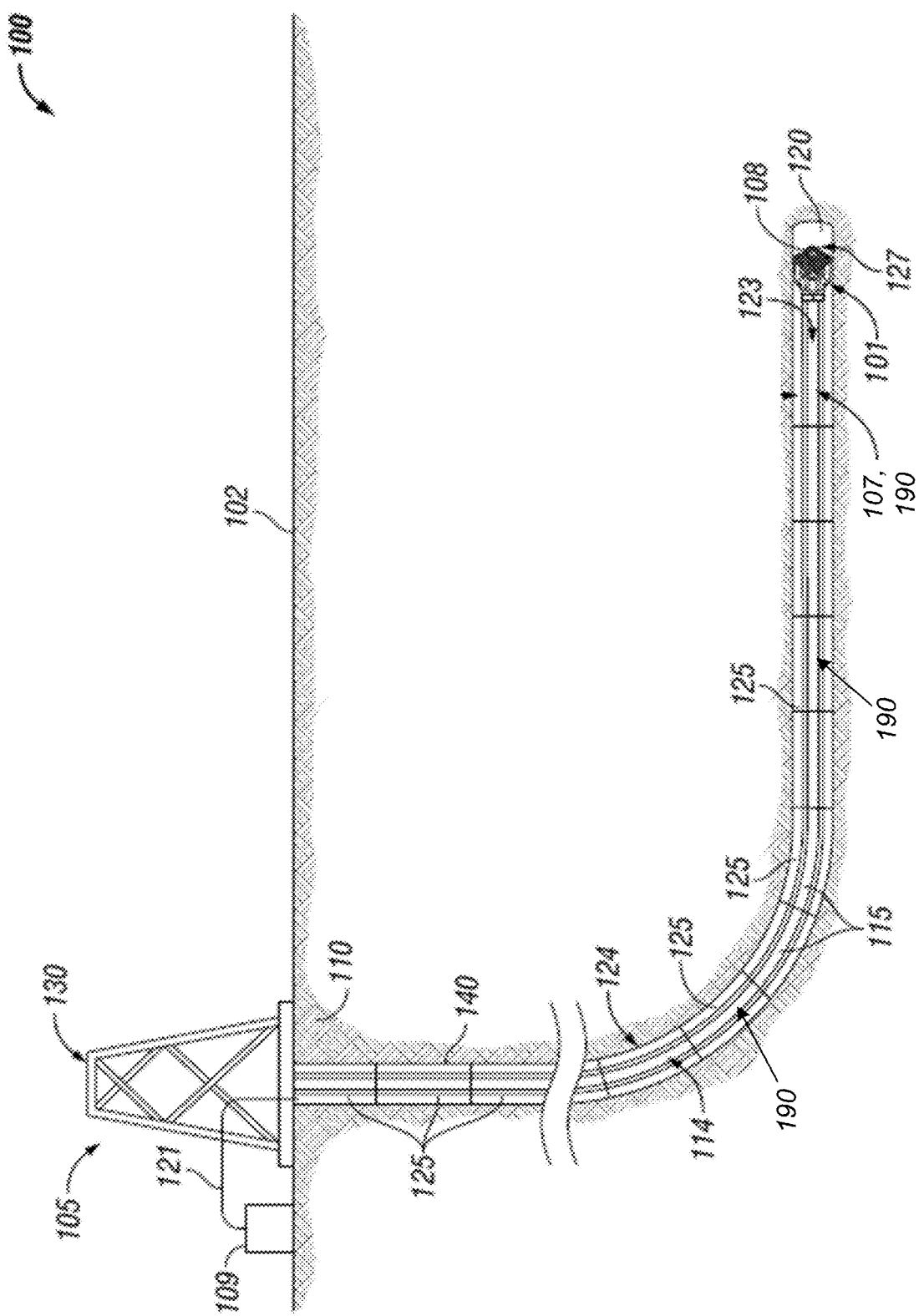

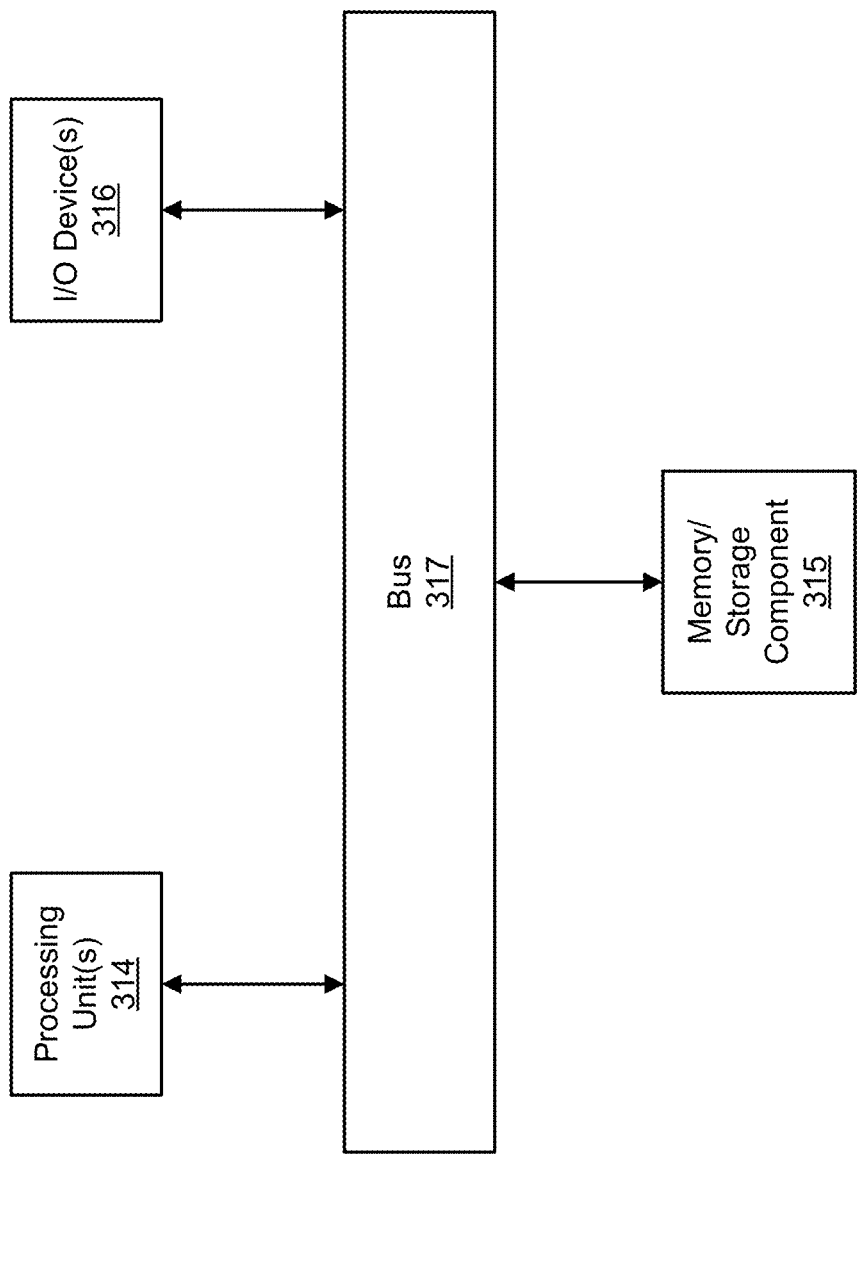

DOWNHOLE ON-DEMAND EXTENDED-LIFE POWER SOURCE SYSTEM

CROSS-REFERENCE TO RELATED APPLICATIONS

This application claims priority under 35 U.S.C. § 119 to U.S. Provisional Patent Application Ser. No. 62/656,569, titled "Downhole On-Demand Extended-Life Power Source System" and filed on Apr. 12, 2018, the entire contents of which are hereby incorporated herein by reference.

TECHNICAL FIELD

Embodiments described herein relate generally to subterranean field operations, and more particularly to systems, methods, and devices for battery systems used in subterranean field operations.

BACKGROUND

Autonomous downhole power sources for the oil and gas industry are utilized in a variety of oil field operations where deploying a downhole electrical cable is impractical or undesirable. Such operations include well monitoring, measurements while drilling and emerging, and permanent intelligent well completion technologies. These intelligent completions incorporate permanent downhole sensors and surface-controlled downhole equipment, enabling monitoring, evaluation, and real-time, active management of a well via wireless acoustic telemetry communication. The power sources used are subjected to, and must reliably operate in, high temperature and pressure environments for extended periods of time. Downhole batteries are one such autonomous power source, but may not be suitable for long term deployment in high temperatures due to decreased battery life. Current downhole battery temperature ratings are on the order of 100° C.-250° C., but have a lifetime/shelf life rating ranging from a few weeks to a couple of months at these elevated temperatures. For long term elevated temperature use, such as permanent downhole sensors, a shelf life on the order of five years or more is desired.

SUMMARY

In general, in one aspect, the disclosure relates to downhole on-demand power source system can include at least one first energy storage device located within a wellbore disposed in a subterranean formation in a first inactive state. The system can also include at least one first trigger that initiates the at least one first energy storage device from the first inactive state to a first active state. The at least one first energy storage device, once initiated, can provide a first power to an electrical load disposed in the wellbore proximate to the at least one first energy storage device. The at least one first energy storage device, when in the first inactive state, can be incapable of providing the first power.

These and other aspects, objects, features, and embodiments will be apparent from the following description and the appended claims.

BRIEF DESCRIPTION OF THE DRAWINGS

The drawings illustrate only example embodiments of downhole on-demand extended-life power source systems and are therefore not to be considered limiting of its scope, as downhole on-demand extended-life power source systems may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIG. 1 shows a schematic diagram of a field system with a subterranean wellbore in which example embodiments can be used.

FIG. 3 shows a computing device in accordance with certain example embodiments.

DETAILED DESCRIPTION OF EXAMPLE EMBODIMENTS

Figure 2A:
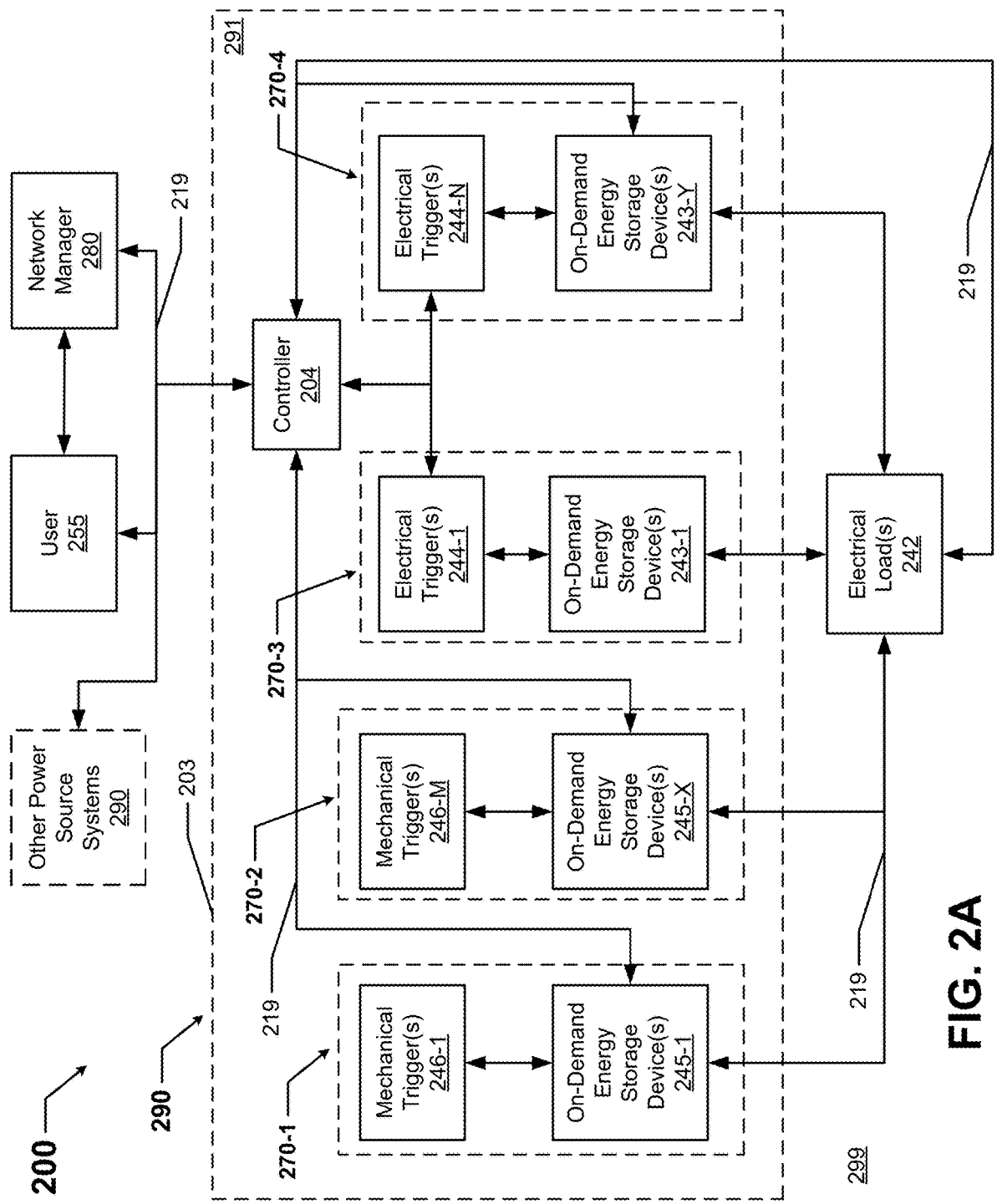
FIGS. 2A and 2B show diagrams of a system that includes a downhole on-demand extended-life power source system in accordance with certain example embodiments.

The example embodiments discussed herein are directed to systems, methods, and devices for downhole on-demand extended-life power source systems. While example embodiments are described herein as being used in subterranean formations (e.g., subterranean wellbores), example embodiments can also be used in any other type of environment where extreme pressures and/or temperatures exist, particularly when it can be difficult or otherwise prohibitive to use a physical cable to provide power and/or control to such environments. Such other environments can include, but are not limited to, near an operating boiler, in a lab, near a geothermal formation, and in a desert. Also, while example embodiments are designed for harsh (e.g., high temperature, high pressure) environments, example embodiments can also be used in any other type of environment (e.g., indoor, outdoor, hazardous, non-hazardous, high humidity, low temperature, corrosive, sterile, high vibration).

Any example downhole on-demand extended-life power source system, or portions (e.g., components) thereof, described herein can be made from a single piece (as from a mold). When an example downhole on-demand extended-life power source system (or portion thereof) is made from a single piece, the single piece can be cut out, bent, stamped, and/or otherwise shaped to create certain features, elements, or other portions of a component. Alternatively, an example downhole on-demand extended-life power source system (or portions thereof) can be made from multiple pieces that are mechanically coupled to each other. In such a case, the multiple pieces can be mechanically coupled to each other using one or more of a number of coupling methods, including but not limited to adhesives, welding, fastening devices, compression fittings, mating threads, and slotted fittings. One or more pieces that are mechanically coupled to each other can be coupled to each other in one or more of a number of ways, including but not limited to fixedly, hingedly, rotatably, removeably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, abut against, fasten, and/or perform other functions aside from merely coupling. In addition, each component and/or feature described herein (including each component of an example downhole on-demand extended-life power source system) can be made of one or more of a number of suitable materials, including but not limited to metal (e.g., stainless steel), ceramic, rubber, glass, and plastic.

A coupling feature (including a complementary coupling feature) as described herein can allow one or more components and/or portions of an example downhole on-demand extended-life power source system (e.g., a housing) to become mechanically coupled, directly or indirectly, to another portion (e.g., an array of energy storage devices) of the downhole on-demand extended-life power source system and/or another component of a bottom hole assembly (BHA) or tubing string. A coupling feature can include, but is not limited to, a portion of a hinge, an aperture, a recessed area, a protrusion, a slot, a spring clip, a tab, a detent, and mating threads. One portion of an example downhole on-demand extended-life power source system can be coupled to another portion of a downhole on-demand extended-life power source system and/or another component of a BHA or tubing string by the direct use of one or more coupling features.

In addition, or in the alternative, a portion of an example downhole on-demand extended-life power source system can be coupled to another portion of the downhole on-demand extended-life power source system and/or another component of a BHA or tubing string using one or more independent devices that interact with one or more coupling features disposed on a component of the downhole on-demand extended-life power source system. Examples of such devices can include, but are not limited to, a pin, a hinge, a fastening device (e.g., a bolt, a screw, a rivet), an adapter, and a spring. One coupling feature described herein can be the same as, or different than, one or more other coupling features described herein. A complementary coupling feature as described herein can be a coupling feature that mechanically couples, directly or indirectly, with another coupling feature.

When used in certain systems (e.g., subterranean field operations), example embodiments can be designed to help such systems comply with certain standards and/or requirements. Examples of entities that set such standards and/or requirements can include, but are not limited to, the Society of Petroleum Engineers, the American Petroleum Institute (API), the International Standards Organization (ISO), and the Occupational Safety and Health Administration (OSHA).

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit or a four-digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of downhole on-demand extended-life power source systems will be described more fully hereinafter with reference to the accompanying drawings, in which example embodiments of downhole on-demand extended-life power source systems are shown. Downhole on-demand extended-life power source systems may, however, be embodied in many different forms and should not be construed as limited to the example embodiments set forth herein. Rather, these example embodiments are provided so that this disclosure will be thorough and complete, and will fully convey the scope of downhole on-demand extended-life power source systems to those of ordinary skill in the art. Like, but not necessarily the same, elements (also sometimes called components) in the various figures are denoted by like reference numerals for consistency.

Terms such as "first", "second", "outer", "inner", "top", "bottom", "distal", "proximal", "on", and "within" are used merely to distinguish one component (or part of a component or state of a component) from another. This list of terms is not exclusive. Such terms are not meant to denote a preference or a particular orientation, and they are not meant to limit embodiments of downhole on-demand extended-life power source system. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a schematic diagram of a land-based field system 100 in which downhole on-demand extended-life power source systems 190 can be used within a subterranean wellbore in accordance with one or more example embodiments. Referring to FIG. 1, the field system 100 in this example includes a wellbore 120 that is formed by a wall 140 in a subterranean formation 110 using field equipment 130. The field equipment 130 can be located above a surface 102, and/or within the wellbore 120. The surface 102 can be ground level for an on-shore application and the sea floor for an off-shore application. The point where the wellbore 120 begins at the surface 102 can be called the entry point.

The subterranean formation 110 can include one or more of a number of formation types, including but not limited to shale, limestone, sandstone, clay, sand, and salt. In certain embodiments, a subterranean formation 110 can also include one or more reservoirs in which one or more resources (e.g., oil, gas, water, steam) can be located. One or more of a number of field operations (e.g., fracking, coring, tripping, drilling, setting casing, extracting downhole resources) can be performed to reach an objective of a user with respect to the subterranean formation 110.

The wellbore 120 can have one or more of a number of segments, where each segment can have one or more of a number of dimensions. Examples of such dimensions can include, but are not limited to, size (e.g., diameter) of the wellbore 120, a curvature of the wellbore 120, a total vertical depth of the wellbore 120, a measured depth of the wellbore 120, and a horizontal displacement of the wellbore 120. The field equipment 130 can be used to create and/or develop (e.g., insert casing pipe, extract downhole materials) the wellbore 120. The field equipment 130 can be positioned and/or assembled at the surface 102. The field equipment 130 can include, but is not limited to, a circulation unit 109 (including circulation line 121, as explained below), a derrick, a tool pusher, a clamp, a tong, drill pipe, a drill bit, example isolator subs, tubing housing (also sometimes called tubing pipe), a power source, and casing pipe.

The field equipment 130 can also include one or more devices that measure and/or control various aspects (e.g., direction of wellbore 120, pressure, temperature) of a field operation associated with the wellbore 120. For example, the field equipment 130 can include a wireline tool that is run through the wellbore 120 to provide detailed information (e.g., curvature, azimuth, inclination) throughout the wellbore 120. Such information can be used for one or more of a number of purposes. For example, such information can dictate the size (e.g., outer diameter) of casing pipe to be inserted at a certain depth in the wellbore 120.

Inserted into and disposed within the wellbore 120 of FIG. 1 are a number of casing pipes 125 that are coupled to each other end-to-end to form the casing string 124. In this case, each end of a casing pipe 125 has mating threads (a type of coupling feature) disposed thereon, allowing a casing pipe 125 to be mechanically coupled to an adjacent casing pipe 125 in an end-to-end configuration. The casing pipes 125 of the casing string 124 can be mechanically coupled to each other directly or using a coupling device, such as a coupling sleeve. The casing string 124 is not disposed in the entire wellbore 120. Often, the casing string 124 is disposed from approximately the surface 102 to some other point in the wellbore 120. The open hole portion 127 of the wellbore 120 extends beyond the casing string 124 at the distal end of the wellbore 120.

Each casing pipe 125 of the casing string 124 can have a length and a width (e.g., outer diameter). The length of a casing pipe 125 can vary. For example, a common length of a casing pipe 125 is approximately 40 feet. The length of a casing pipe 125 can be longer (e.g., 60 feet) or shorter (e.g., 10 feet) than 40 feet. The width of a casing pipe 125 can also vary and can depend on the cross-sectional shape of the casing pipe 125. For example, when the cross-sectional shape of the casing pipe 125 is circular, the width can refer to an outer diameter, an inner diameter, or some other form of measurement of the casing pipe 125. Examples of a width in terms of an outer diameter can include, but are not limited to, 7 inches, 7⅝ inches, 8⅝ inches, 10¾ inches, 13⅜ inches, and 14 inches.

The size (e.g., width, length) of the casing string 124 can be based on the information gathered using field equipment 130 with respect to the wellbore 120. The walls of the casing string 124 have an inner surface that forms a cavity 123 that traverses the length of the casing string 124. Each casing pipe 125 can be made of one or more of a number of suitable materials, including but not limited to stainless steel. In certain example embodiments, each casing pipe 125 is made of one or more of a number of electrically conductive materials.

A number of tubing housings 115 that are coupled to each other and inserted inside the cavity 123 form the tubing string 114. The collection of tubing housings 115 can be called a tubing string 114. The tubing housings 115 of the tubing string 114 are mechanically coupled to each other end-to-end, usually with mating threads (a type of coupling feature). The tubing housings 115 of the tubing string 114 can be mechanically coupled to each other directly or using a coupling device, such as a coupling sleeve or an isolator sub (both not shown). Also disposed within the tubing string 114 can be one or more example downhole on-demand extended-life power source systems 190. In this example, there are two downhole on-demand extended-life power source systems 190 integrated in-line with the tubing string 114, and a third downhole on-demand extended-life power source system 190 integrated with the BHA 101, as discussed below. Each tubing housing 115 of the tubing string 114 can have a length and a width (e.g., outer diameter). The length of a tubing housing 115 can vary. For example, a common length of a tubing housing 115 is approximately 30 feet. The length of a tubing housing 115 can be longer (e.g., 40 feet) or shorter (e.g., 10 feet) than 30 feet. Also, the length of a tubing housing 115 can be the same as, or different than, the length of an adjacent casing pipe 125.

The width of a tubing housing 115 can also vary and can depend on one or more of a number of factors, including but not limited to the target depth of the wellbore 120, the total length of the wellbore 120, the inner diameter of the adjacent casing pipe 125, and the curvature of the wellbore 120. The width of a tubing housing 115 can refer to an outer diameter, an inner diameter, or some other form of measurement of the tubing housing 115. Examples of a width in terms of an outer diameter for a tubing housing 115 can include, but are not limited to, 7 inches, 5 inches, and 4 inches.

In some cases, the outer diameter of the tubing housing 115 can be such that a gap exists between the tubing housing 115 and an adjacent casing pipe 125. The walls of the tubing housing 115 have an inner surface that forms a cavity that traverses the length of the tubing housing 115. The tubing housing 115 can be made of one or more of a number of suitable materials, including but not limited to steel.

At the distal end of the tubing string 114 within the wellbore 120 is a BHA 101. The BHA 101 can include one or more of a number of components, including but not limited to a bit 108 at the far distal end, an example downhole on-demand extended-life power source system 190, an operating tool 107, one or more tubing housings 115, and one or more stabilizers. During a field operation, the tubing string 114, including the BHA 101, can be rotated by other field equipment 130.

The circulation unit 109 can include one or more components that allow a user to control the one or more downhole components (e.g., a portion of the BHA 101, one or more example downhole on-demand extended-life power source systems 190) from the surface 102. Examples of such components of the circulation unit 109 can include, but are not limited to, a compressor, one or more valves, a pump, piping, and a motor. The circulating line 121 transmits fluid from the circulating unit 109 downhole to the BHA 101 and any other components between the BHA 101 and the surface 102.

Figure 2B:
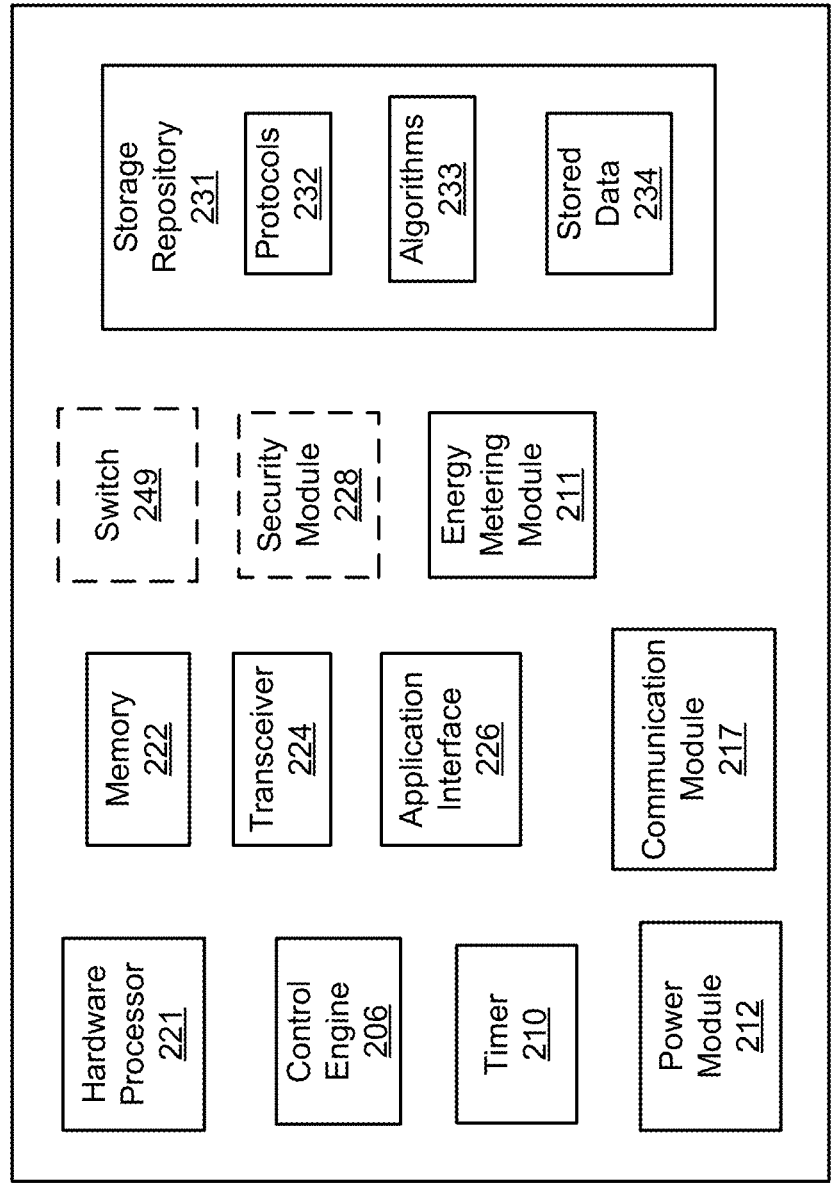

FIGS. 2A and 2B show diagrams of a system 200 that includes one or more downhole on-demand extended-life power source systems 290 (or, more simply, power source systems 290) in accordance with certain example embodiments. In addition to the one or more power source systems 290, the system 200 can include one or more users 255, one or more electrical loads 242, and a network manager 280, where the electrical loads 242 and the power source systems 290 are located in a high-pressure and/or high-temperature (e.g., in excess of 125° C.) environment 299.

A power source system 290 can include a controller 204 and one or more cells 270. In this case, there are four expressly-shown cells 270: Cell 270-1, cell 270-2, cell 270-3, and cell 270-4. Generally speaking, each cell 270 can include one or more triggers (e.g., mechanical trigger 246, electrical trigger 244) and one or more on-demand energy storage devices (e.g., on-demand energy storage devices 245, on-demand energy storage devices 243). If the power source system 290 has multiple cells 270, then one cell 270 can be physically separated from the other cells 270. Alternatively, the multiple cells 270 can be co-mingled with each other. More information about the triggers and the on-demand energy storage devices are provided below.

The controller 204 of a power source system 290 is coupled to each cell 270 (or portions thereof) of the power source system 290. The controller 204 can include one or more of a number of components. For example, as shown in FIG. 2B, such components of the controller 204 can include, but are not limited to, a control engine 206, a communication module 217, a timer 210, an energy metering module 211, a power module 212, a storage repository 231, a hardware processor 221, a memory 222, a transceiver 224, an application interface 226, and, optionally, a security module 228.

The components shown in FIGS. 2A and 2B are not exhaustive, and in some embodiments, one or more of the components shown in FIGS. 2A and 2B may not be included in the example system 200. For instance, any component of the example power source system 290 can be discrete or combined with one or more other components of the power source system 290. For example, rather than having multiple triggers, a power source system 290 can have only a single trigger (e.g., electrical trigger 244-1) that is coupled to all on-demand energy storage devices of the power source system 290. As another example, the controller 204 can be remotely located with respect to the rest of the power source system 290. As yet another example, a trigger (e.g., electrical trigger 244-N) can be part of the controller 204. As still another example, one or more of the components of the controller 204 can be omitted or shared with another component (e.g., a user 255, the network manager 280) of the system 200.

Referring to FIGS. 1 through 2B, a user 255 as described herein may be any person that is involved with a field operation in a subterranean wellbore and/or some other high-temperature and/or high-pressure environment 299. Examples of a user 255 may include, but are not limited to, a roughneck, a company representative, a drilling engineer, a tool pusher, a service hand, a field engineer, an electrician, a mechanic, an operator, a consultant, a contractor, and a manufacturer's representative. For field operations involving subterranean environments 299, a user 255 can be located at or above the surface (e.g., surface 102). In some cases, a user 255 can be remotely located.

The user 255 can use a user system (not shown), which may include a display (e.g., a GUI). The user 255 interacts with (e.g., sends data to, receives data from) the controller 204 of one or more power source systems 290 via the application interface 226 (described below). The user 255 can also interact with a network manager 280 and/or one or more electrical loads 242. Interaction between the user 255, the power source systems 290, and the network manager 280 is conducted using communication links 219. Similarly, communication within any of these components (e.g., a power source system 290) can be facilitated using one or more communication links 219.

Each communication link 219 can include wired (e.g., Class 1 electrical cables, Class 2 electrical cables, electrical connectors) and/or wireless (e.g., Wi-Fi, visible light communication, telemetry, sound waves, cellular networking, Bluetooth, WirelessHART, ISA100, Power Line Carrier, RS485, DALI) technology. For example, a communication link 219 can be (or include) one or more electrical conductors that are used to communicate between the controller 204 and an electrical trigger 244 (e.g., electrical trigger 244-1) within a power source system 290. As another example, a communication link 219 can use telemetry (e.g., acoustic waves, pulses), rather than a physical cable, to communicate between the controller 204 of the power source system 290 and a component at or above the surface 102 (e.g., the network manager 280, a user 255). The communication link 219 can transmit signals (e.g., power signals, communication signals, control signals, data) between a power source system 290, the user 255, one or more electrical loads 242, and the network manager 280.

The network manager 280 is a device or component that controls (e.g., provides instructions, provides updates) all or a portion of the system 200 that includes the controller 204 of a power source system 290. The network manager 280 can be substantially similar to the controller 204. Alternatively, the network manager 280 can include one or more of a number of features in addition to, or altered from, the features of the controller 204 described below. For field operations involving subterranean environments 299, the network manager 280 can be located at or above the surface (e.g., surface 102). In some cases, the network manager 280 can be remotely located.

Each electrical load 242 represents the electrical usage and/or demand of an electrical device located in the environment 299. In certain example embodiments, an electrical load 242 is disposed in close proximity to one or more on-demand energy storage devices 243, 245. Electrical devices associated with an electrical load 242 can include, but are not limited to, sensors, shifting sleeves, communication devices, detonation devices, meters, solenoids, and motors. An electrical load 242 can be disposed proximate to one or more cells 270. Put another way, one or more cells 270 can be placed at locations that are proximate to an electrical load 242 in the environment 299 for the purpose of providing power to that electrical load 242.

A user 255, the network manager 280, one or more electrical loads 242, and/or any other power source system 290 can interact with the controller 204 of the power source system 290 using the application interface 226 in accordance with one or more example embodiments. Specifically, the application interface 226 of the controller 204 receives data (e.g., information, communications, instructions) from and sends data (e.g., information, communications, instructions)

to a user 255, another power source system 290, one or more electrical loads 242, and the network manager 280. A user 255 and the network manager 280 can include an interface to receive data from and send data to the controller 204 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 204 of the power source system 290, a user 255, and/or the network manager 280 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 204. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 3.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 200.

As discussed below with respect to FIGS. 4A through 10, the power source system 290 can include a housing 203. The housing 203 can include at least one wall that forms a cavity 291. In some cases, the housing 203 can be designed to comply with any applicable standards so that the power source system 290 can be located in a particular environment 299 (e.g., a high-temperature environment, a high-pressure environment).

The housing 203 of the power source system 290 can be used to house one or more components of the power source system 290, including one or more components of the controller 204. For example, the controller 204 (which in this case includes the control engine 206, the communication module 217, the timer 210, the energy metering module 211, the power module 212, the storage repository 231, the hardware processor 221, the memory 222, the transceiver 224, the application interface 226, and the optional security module 228), one or more triggers, one or more on-demand energy storage devices, and, in some cases, one or more electrical loads 242 can be disposed in the cavity 291 formed by the housing 203. In alternative embodiments, any one or more of these or other components of the power source system 290 can be disposed on the housing 203 and/or remotely from the housing 203.

The storage repository 231 can be a persistent storage device (or set of devices) that stores software and data used to assist the controller 204 in communicating with the user 255, the network manager 280, one or more electrical loads 242, and any other applicable power source systems 290 within the system 200. In one or more example embodiments, the storage repository 231 stores one or more protocols 232, algorithms 233, and stored data 234. The protocols 232 can be any procedures (e.g., a series of method steps) and/or other similar operational procedures that the control engine 206 of the controller 204 follows based on certain conditions at a point in time.

The protocols 232 can also include any of a number of communication protocols that are used to send and/or receive data between the controller 204 and the user 255, the network manager 280, and any other power source systems 290. One or more of the communication protocols 232 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 232 can provide a layer of security to the data transferred within the system 200.

The algorithms 233 can be any formulas, mathematical models, forecasts, simulations, and/or other similar tools that the control engine 206 of the controller 204 uses to reach a computational conclusion. An example of one or more algorithms 233 is calculating, using parameters measured by the energy metering module 211, the amount of time before one or more additional on-demand energy storage devices (e.g., on-demand energy storage device 243, on-demand energy storage device 245) need to be initiated (activated). Another example of one or more algorithms 233 is to calculate an amount of energy consumed by an electrical load 242 in the environment 299. Particular algorithms 233 are often used in conjunction with particular protocols 232. Algorithms 233 can be used to analyze past data, use current data, and/or perform forecasts.

Stored data 234 can be any data that is stored for potential future use, as with an algorithm 233 or for trending analysis. Such data can include, but is not limited to, threshold values, results of algorithms 233, parameters measured by the energy metering module 211, status of the on-demand energy storage devices 243, 245, status of the triggers 244, 246, communication potential between a particular trigger 244, 246 and particular on-demand energy storage devices 243, 245, and user preferences. Stored data 234 can also include any information about the electrical loads 242, including but not limited to nameplate data for the electrical load 242, historical usage of the electrical load 242, and operational parameters of the electrical load 242.

Examples of a storage repository 231 can include, but are not limited to, a database (or a number of databases), a file system, a hard drive, flash memory, some other form of solid state data storage, or any suitable combination thereof. The storage repository 231 can be located on multiple physical machines, each storing all or a portion of the protocols 232, algorithms 233, and/or the stored data 234 according to some example embodiments. Each storage unit or device can be physically located in the same or in a different geographic location.

The storage repository 231 can be operatively connected to the control engine 206. In one or more example embodiments, the control engine 206 includes functionality to communicate with a user 255, the network manager 280, one or more electrical loads 242, and any other applicable power source systems 290 in the system 200. More specifically, the control engine 206 sends information to and/or receives information from the storage repository 231 in order to communicate with a user 255, the network manager 280, one or more electrical loads 242, and any other power source systems 290. As discussed below, the storage repository 231 can also be operatively connected to the communication module 217 in certain example embodiments.

In certain example embodiments, the control engine 206 of the controller 204 controls the operation of one or more other components (e.g., the communication module 217, the timer 210, the transceiver 224) of the controller 204. For example, the control engine 206 can put the communication module 217 in "sleep" mode when there are no communications between the controller 204 and another component (e.g., the user 255) in the system 200 or when communications between the controller 204 and another component in the system 200 follow a regular pattern. In such a case, power consumed by the controller 204 is conserved by only enabling the communication module 217 when the communication module 217 is needed.

As another example, the control engine 206 can direct the timer 210 when to provide a current time, to begin tracking a time period, and/or perform another function within the capability of the timer 210. As yet another example, the control engine 206 can direct the transceiver 224 to send and/or receive communications to one or more other components of the power source system 290 and/or another component in the system 200.

The control engine 206 can determine, using parameters measured by the energy metering module 211, one or more algorithms 233, and one or more protocols 232, what the current demand is for each electrical load 242, which currently-inactive on-demand energy storage devices 243, 245 are available for which particular electrical loads 242, the capability of each of the currently-inactive on-demand energy storage devices 243, 245, how each of those currently-inactive on-demand energy storage devices 243, 245 can be triggered, and any other information required to serve the electrical loads 242 continuously and reliably.

The control engine 206 can determine when to initiate a trigger (e.g., electrical trigger 244) so that one or more particular on-demand energy storage devices 243, 245 are activated. To conserve energy, the control engine 206, using the energy metering module 211, does not constantly measure electrical parameters (for example, for one or more activated particular on-demand energy storage devices 243, 245 and/or for electrical loads 242). The control engine 206 can be active to measure electrical parameters based on one or more of a number of factors, including but not limited to passage of time, the occurrence of an event, instructions from a user 255, and a command received from the network manager 280.

In some cases, when the system 200 includes multiple power source systems 290, each power source system 290 can have some form of a controller 204. In such a case, the control engine 206 of one controller 204 can coordinate with the controllers 204 of one or more of the other power source systems 290. The control engine 206 can use one or more protocols 232 and/or algorithms 233 to determine when to initiate one or more triggers to activate one or more on-demand energy storage devices 243, 245.

The control engine 206 can provide control, data, power, communication, and/or other signals to a user 255, the network manager 280, one or more electrical loads 242, and one or more other power source systems 290. Similarly, the control engine 206 can receive control, data, power, communication, and/or other signals from a user 255, the network manager 280, and one or more other power source systems 290. The control engine 206 can communicate automatically (for example, based on one or more algorithms 233 stored in the storage repository 231) and/or based on control, data, power, communication, and/or other similar signals received from another component (e.g., the network manager 280) in the system. The control engine 206 may include a printed circuit board, upon which the hardware processor 221 and/or one or more discrete components of the controller 204 are positioned. In certain example embodiments, the control engine 206 can include an interface that enables the control engine 206 to communicate with one or more components (e.g., electrical trigger 244-1, on-demand energy storage device 245-1) of the power source system 290 and/or an electrical load 242.

The control engine 206 (or other components of the controller 204) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM). In addition, or in the alternative, such features can be included in an electrical load 242, a user system of a user 255, and/or in the network manager 280.

Using example embodiments, while at least a portion (e.g., the control engine 206, the timer 210) of the controller 204 is always on, the remainder of the controller 204 can be in sleep mode when they are not being used. In addition, the controller 204 can control certain aspects (e.g., initiating a trigger) of one or more other power source systems 290 in the system 200.

The communication network (using the communication links 219) of the system 200 (or portions thereof) can have any type of network architecture. For example, the communication network of the system 200 can be a mesh network. As another example, the communication network of the system 200 can be a star network. When the controller 204 includes an additional energy storage device (e.g., a battery as part of the power module 212), even more power can be conserved in the operation of the system 200, or portions thereof. In addition, using time-synchronized communication protocols 232, the data transferred between the controller 204, a user 255, the network manager 280, one or more electrical loads 242, and any other power source systems 290 can be secure.

The communication module 217 of the controller 204 determines and implements the communication protocol (e.g., from the protocols 232 of the storage repository 231) that is used when the control engine 206 communicates with (e.g., sends signals to, receives signals from) a user 255, the network manager 280, one or more electrical loads 242, and/or other power source systems 290. In some cases, the communication module 217 accesses the stored data 234 to determine which communication protocol is within the capability of a component of the system 200 that is in communication with the control engine 206. In addition, the communication module 217 can interpret the communication protocol 232 of a communication received by the controller 204 so that the control engine 206 can interpret the communication.

The communication module 217 can send data (e.g., protocols 232, stored data 234) directly to and/or retrieve data directly from the storage repository 231. Alternatively, the control engine 206 can facilitate the transfer of data between the communication module 217 and the storage repository 231. The communication module 217 can also provide encryption to data that is sent by the controller 204 and decryption to data that is received by the controller 204. The communication module 217 can also provide one or more of a number of other services with respect to data sent from and received by the controller 204. Such services can include, but are not limited to, data packet routing information and procedures to follow in the event of data interruption.

The timer 210 of the controller 204 can track clock time, intervals of time, an amount of time, and/or any other measure of time. The timer 210 can also count the number of occurrences of an event, whether with or without respect to time. Alternatively, the control engine 206 can perform the counting function. The timer 210 is able to track multiple time measurements concurrently. The timer 210 can measure multiple times simultaneously. The timer 210 can track time periods based on an instruction received from the control engine 206, based on an instruction received from the user 255, based on an instruction programmed in the software for the controller 204, based on some other condition or from some other component, or from any combination thereof.

The energy metering module 211 of the controller 204 measures one or more components of power (e.g., current, voltage, resistance, VARs, watts) at one or more points (e.g., current storage capacity of an on-demand energy storage device, real-time demand of an electrical load 242) associated with the system 200. The energy metering module 211 can include any of a number of measuring devices and related devices, including but not limited to a voltmeter, an ammeter, a power meter, an ohmmeter, a current transformer, a potential transformer, and electrical wiring. The energy metering module 211 can measure a component of power continuously, periodically, based on the occurrence of an event, based on a command received from the control module 206, and/or based on some other factor.

The power module 212 of the controller 204 provides power to one or more other components (e.g., timer 210, control engine 206) of the controller 204. In addition, in certain example embodiments, the power module 212 can provide power to a trigger (e.g., electrical trigger 244-1). The power module 212 can include one or more of a number of single or multiple discrete components (e.g., transistor, diode, resistor), and/or a microprocessor. The power module 212 may include a printed circuit board, upon which the microprocessor and/or one or more discrete components are positioned.

The power module 212 can include one or more components (e.g., a transformer, a diode bridge, an inverter, a converter) that receives power (for example, through an electrical cable) from a source external to the power source system 290 and generates power of a type (e.g., alternating current, direct current) and level (e.g., 12V, 24V, 120V) that can be used by the other components of the controller 204. In addition, or in the alternative, the power module 212 can be a source of power in itself to provide signals to the other components of the controller 204. For example, the power module 212 can or include be a battery. As another example, the power module 212 can be or include a supercapacitor.

As yet another example, the power module 212 can include a downhole energy harvesting unit such as wellbore-fluid driven piezoelectric or turbine power generator. In such a case, if one or more of the on-demand energy storage devices 244, 246 are rechargeable, then the power module 212 can be used to recharge those on-demand energy storage devices 244, 246. Such an example power source system 290 can extend the shelf life of the power module 212 and the on-demand energy storage devices 244, 246, as rechargeable batteries are not immune to the detrimental effects of high-temperature and/or high-pressure environments 299. By sequentially activating new rechargeable battery cells downhole, a long-term, high temperature energy harvesting unit can be realized.

The hardware processor 221 of the controller 204 executes software in accordance with one or more example embodiments. Specifically, the hardware processor 221 can execute software on the control engine 206 or any other portion of the controller 204, as well as software used by a user 255, the network manager 280, and/or any other power source systems 290. The hardware processor 221 can be an integrated circuit, a central processing unit, a multi-core processing chip, a multi-chip module including multiple multi-core processing chips, or other hardware processor in one or more example embodiments. The hardware processor 221 is known by other names, including but not limited to a computer processor, a microprocessor, and a multi-core processor.

In one or more example embodiments, the hardware processor 221 executes software instructions stored in memory 222. The memory 222 includes one or more cache memories, main memory, and/or any other suitable type of memory. The memory 222 is discretely located within the controller 204 relative to the hardware processor 221 according to some example embodiments. In certain configurations, the memory 222 can be integrated with the hardware processor 221.

In certain example embodiments, the controller 204 does not include a hardware processor 221. In such a case, the controller 204 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 204 (or portions thereof) to be programmable and function according to certain logic rules and thresholds without the use of a hardware processor. Alternatively, FPGAs, IGBTs, ICs, and/or similar devices can be used in conjunction with one or more hardware processors 221.

The transceiver 224 of the controller 204 can send and/or receive power, data, control, and/or communication signals. Specifically, the transceiver 224 can be used to transfer data between the controller 204 and a user 255, the network manager 280, and/or other power source systems 290. The transceiver 224 can use wired and/or wireless technology. The transceiver 224 can be configured in such a way that the control and/or communication signals sent and/or received by the transceiver 224 can be received and/or sent by another transceiver that is part of a user 255, the network manager 280, and/or other power source systems 290.

When the transceiver 224 uses wireless technology, any type of wireless technology can be used by the transceiver 224 in sending and/or receiving signals. Such wireless technology can include, but is not limited to, Wi-Fi, visible light communication, sound waves, cellular networking, and Bluetooth. The transceiver 224 can use one or more of any number of suitable communication protocols (e.g., ISA100, HART) when sending and/or receiving signals. Such communication protocols can be stored in the protocols 232 of the storage repository 231. Further, any transceiver information for a user 255, the network manager 280, and/or other power source systems 290 can be part of the stored data 234 (or similar areas) of the storage repository 231.

Optionally, in one or more example embodiments, the security module 228 secures interactions between the controller 204, a user 255, the network manager 280, and/or other power source systems 290. More specifically, the security module 228 authenticates communication from software based on security keys verifying the identity of the source of the communication. For example, user software may be associated with a security key enabling the software of the user 255 to interact with the controller 204 of the power source system 290. Further, the security module 228 can restrict receipt of information, requests for information, and/or access to information in some example embodiments.

As mentioned above, aside from the controller 204 and its components, the power source system 290 can include one or more cells 270, where each cell 270 includes one or more triggers (e.g., mechanical trigger(s) 246, electrical trigger(s) 244) and one or more on-demand energy storage devices 243, 245. A cell 270 can be physical (e.g., has its own housing with its own dedicated triggers 244, 246 and its own dedicated on-demand energy storage devices 243, 245), virtual (e.g., is configurable by the controller 204), or a combination of the two.

In certain embodiments, a trigger (e.g., electrical trigger 244, mechanical trigger 246) is used to convert one or more on-demand energy storage devices 243, 245 from an inactive state to an active state. There can be multiple types of triggers. For example, as shown in FIG. 2A, there are electrical triggers 244 and mechanical triggers 246. There can also be multiples of each type of trigger. In this case, there are M mechanical triggers 246-M, and there are N electrical triggers 244-N, where M and N can be the same or different numbers. In some cases, M or N can be zero.

An electrical trigger 244 is activated by the controller 204 and/or other component (e.g., another controller of another power source system 290) of the system 200 using some electrical form of initiation (e.g., transmission of a control signal, transmission of a power signal, expiration of a countdown initiated by the timer 210) through one or more communication links 219. A mechanical trigger 246 is activated by a mechanical mechanism (e.g., a pressure-initiated switch, a temperature-initiated switch) independent of the controller 204 and/or other component of the system 200. In such a case, the mechanical mechanism can be part of the mechanical trigger 246. Examples of a mechanical trigger 246 can include, but are not limited to, wellbore pressure, direct mechanical force, seismic activity, magnetic force, electromagnetic force, ultrasonic stimulation, and acoustic stimulation.

When a trigger (e.g., mechanical trigger 246, electrical trigger 244) is activated, the activation causes (initiates) one or more on-demand energy storage devices 243, 245 to go from an inactive state to an active state. A trigger 244, 246 can be used to activate one or more particular, pre-determined (e.g., hardwired) on-demand energy storage devices 243, 245. Alternatively, a trigger 244, 246 can be configured to activate one or more on-demand energy storage devices 243, 245 that are identified in real time (e.g., using protocols 232 and/or algorithms 233).

A trigger 244, 246 can activate a single on-demand energy storage device 243, 245 or multiple on-demand energy storage devices 243, 245. When multiple on-demand energy storage devices 243, 245 are involved, a trigger 244, 246 can active all of the on-demand energy storage devices 243, 245 at one time. Alternatively, a trigger 244, 246 can active the on-demand energy storage devices 243, 245 over time (e.g., in a pre-determined time and/or sequence, based on current and/or anticipated demand of the electrical loads 242). In some cases, a trigger 244, 246 can be initiated by a user 255, the network manager 280, and/or a controller of another power source system 290. A trigger 244, 246 can also be initiated by well intervention techniques and tools, such as wireline or coiled tubing.

The power source system 290 includes one or more on-demand energy storage devices 243, 245. In this case, there are X on-demand energy storage devices 245, and there are Y on-demand energy storage devices 243, where X and Y can be the same or different numbers. In some cases, X or Y can be zero. There can be one or more characteristics (e.g., chemical make-up) of the on-demand energy storage devices 245 that are the same as, or different than, the corresponding characteristics of the on-demand energy storage devices 243.

In this case, the on-demand energy storage devices 243, 245 are configured to have an inactive state and an active state. In the inactive state, the on-demand energy storage devices 243, 245 physically separates two or more compounds (e.g., a liquid electrolyte, a cathode, an anode) to prevent the mixture of those compounds. A trigger 244, 246 is what is used to allow at least one of those compounds to mix with another. When such compounds are mixed, the on-demand energy storage device 243, 245 becomes active, meaning that the on-demand energy storage device 243, 245 generates power that can be used by one or more electrical loads 242. Such compounds can be mixed, for example, through capillary action, active pumping, or centrifugal force.

Each on-demand energy storage device 243, 245 can have any of a number of components. For example, an on-demand energy storage device 243, 245 can include an anode, a separator, an electrolyte solvent, an electrolyte salt, and a cathode. In addition, each component of an on-demand energy storage device 243, 245 can be made of a material that is suitable for the high-temperature and/or high-pressure environment 299 to which it is exposed. For example, rather than the anode being made of pure lithium, which melts at temperatures above approximately 150° C., the anode can be made of a suitable lithium alloy (e.g., LiMg or LiBMg) that remains solid above the melting point of pure lithium metal.

FIG. 3 illustrates one embodiment of a computing device 318 that implements one or more of the various techniques described herein, and which is representative, in whole or in part, of the elements described herein pursuant to certain exemplary embodiments. For example, the controller 204 of FIGS. 2A and 2B, including its various components (e.g., control engine 206, hardware processor 221, memory 222, storage repository 231) can be considered, in whole or in part, a computing device 318. Computing device 318 is one example of a computing device and is not intended to suggest any limitation as to scope of use or functionality of the computing device and/or its possible architectures. Neither should computing device 318 be interpreted as having any dependency or requirement relating to any one or combination of components illustrated in the example computing device 318.

Computing device 318 includes one or more processors or processing units 314, one or more memory/storage components 315, one or more input/output (I/O) devices 316, and a bus 317 that allows the various components and devices to communicate with one another. Bus 317 represents one or more of any of several types of bus structures, including a memory bus or memory controller, a peripheral bus, an accelerated graphics port, and a processor or local bus using any of a variety of bus architectures. Bus 317 includes wired and/or wireless buses.

Memory/storage component 315 represents one or more computer storage media. Memory/storage component 315 includes volatile media (such as random access memory (RAM)) and/or nonvolatile media (such as read only memory (ROM), flash memory, optical disks, magnetic disks, and so forth). Memory/storage component 315 includes fixed media (e.g., RAM, ROM, a fixed hard drive, etc.) as well as removable media (e.g., a Flash memory drive, a removable hard drive, an optical disk, and so forth).

One or more I/O devices 316 allow a customer, utility, or other user to enter commands and information to computing device 318, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 318 is connected to a network (not shown) (e.g., a LAN, a WAN such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 318 includes at least the minimal processing, input, and/or output means necessary to practice one or more embodiments.

Further, those skilled in the art will appreciate that one or more elements of the aforementioned computer device 318 is located at a remote location and connected to the other elements over a network in certain exemplary embodiments. Further, one or more embodiments is implemented on a distributed system having one or more nodes, where each portion of the implementation (e.g., control engine 206) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

As stated above, a common problem with using battery systems in high-pressure and/or high-temperature environments, such as in wellbores of a field operation, is that such systems have a short shelf life and a shortened duration. Example embodiments allow for long-term power storage at elevated temperatures by storing the reactive components of the on-demand energy storage system separately relative to each other, and then mix them for "on demand" electrical power. Using this novel approach of separating the redox constituents and delaying the chemical reactions until needed enables long term storage at elevated temperatures and/or pressures. FIGS. 4A through 10 below show several variations of an example power source system 290.

Figure 4A:
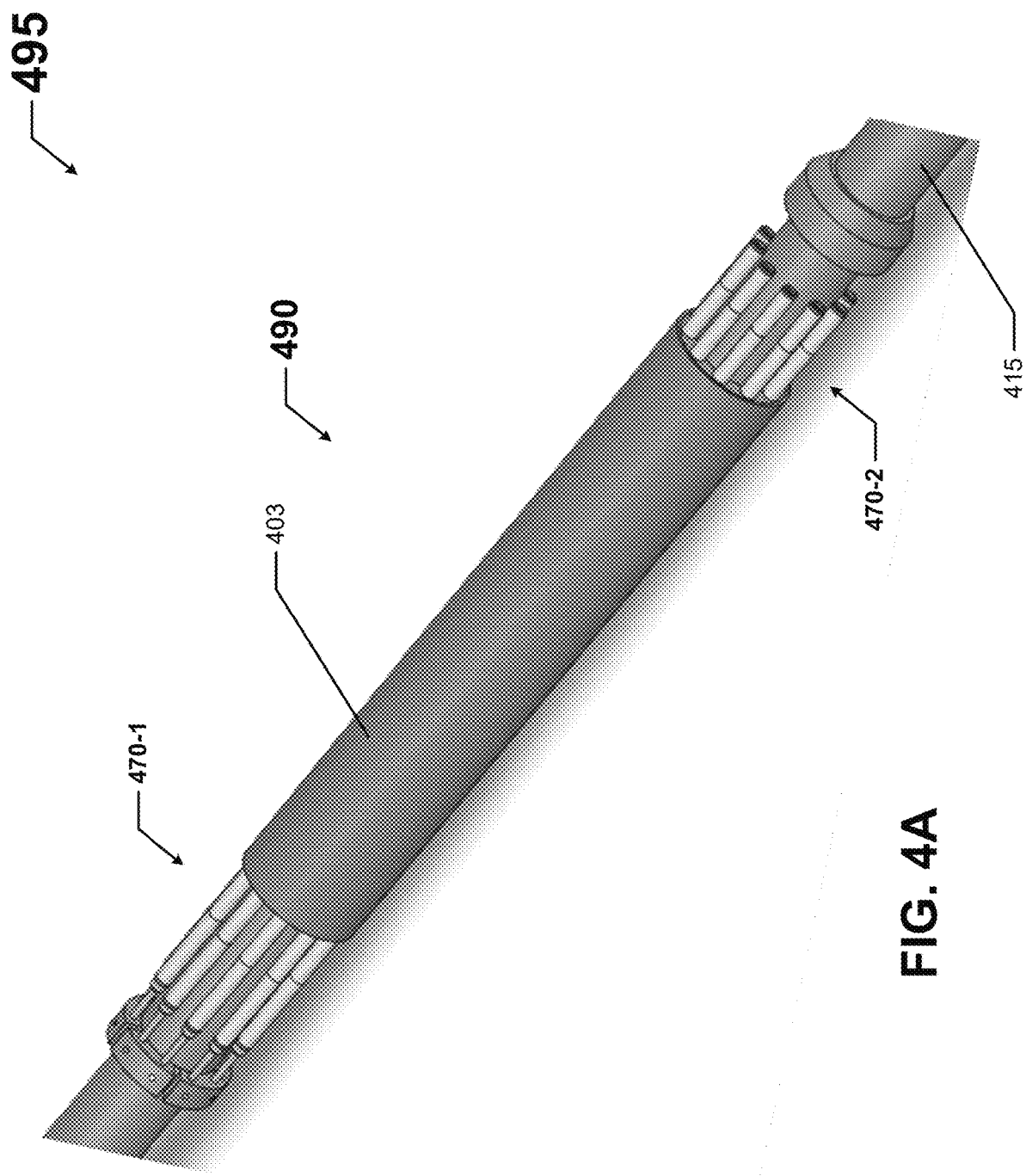
FIGS. 4A through 4C show a downhole on-demand extended-life power source system assembly in accordance with certain example embodiments.
Figure 4B:
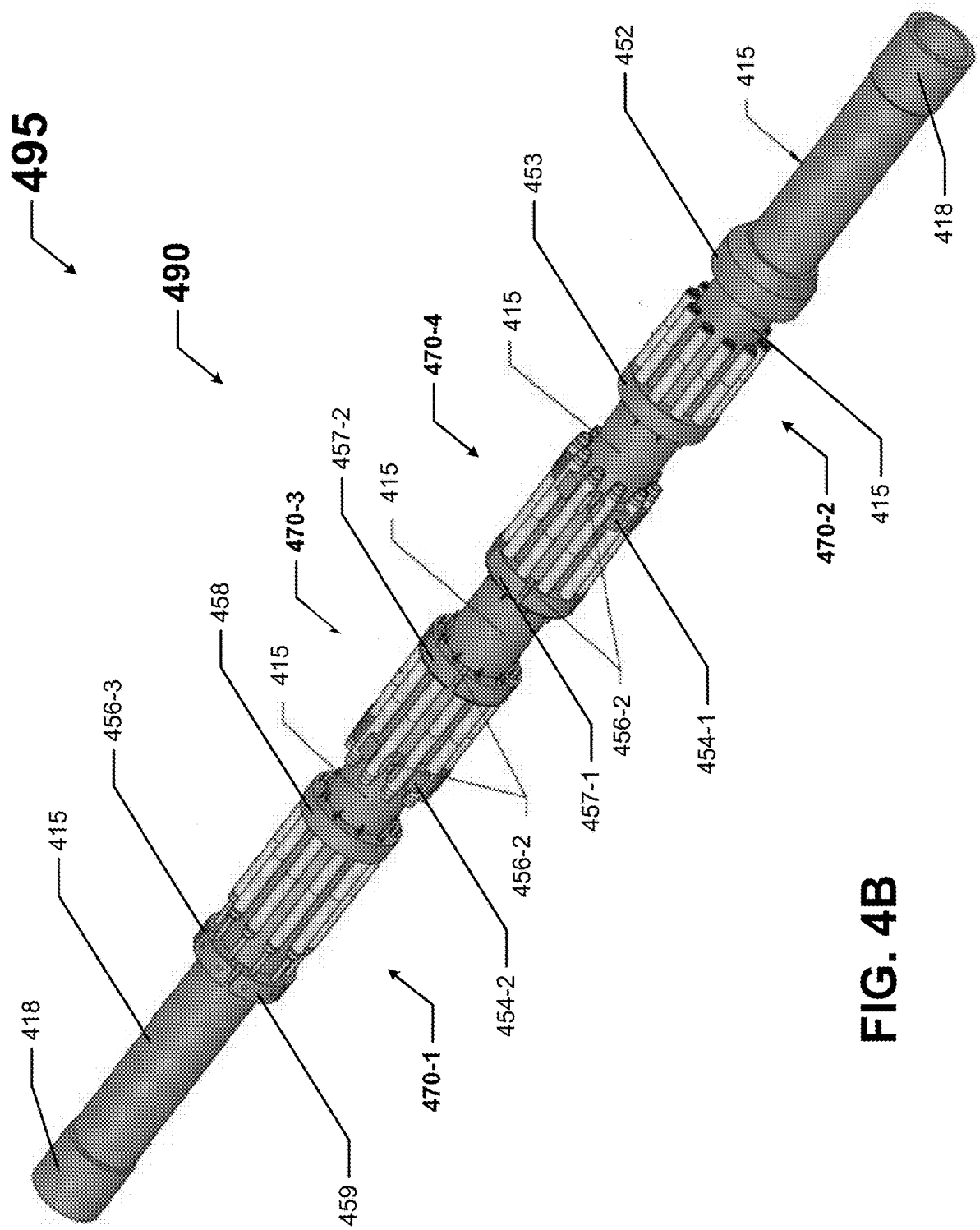
Figure 4C:
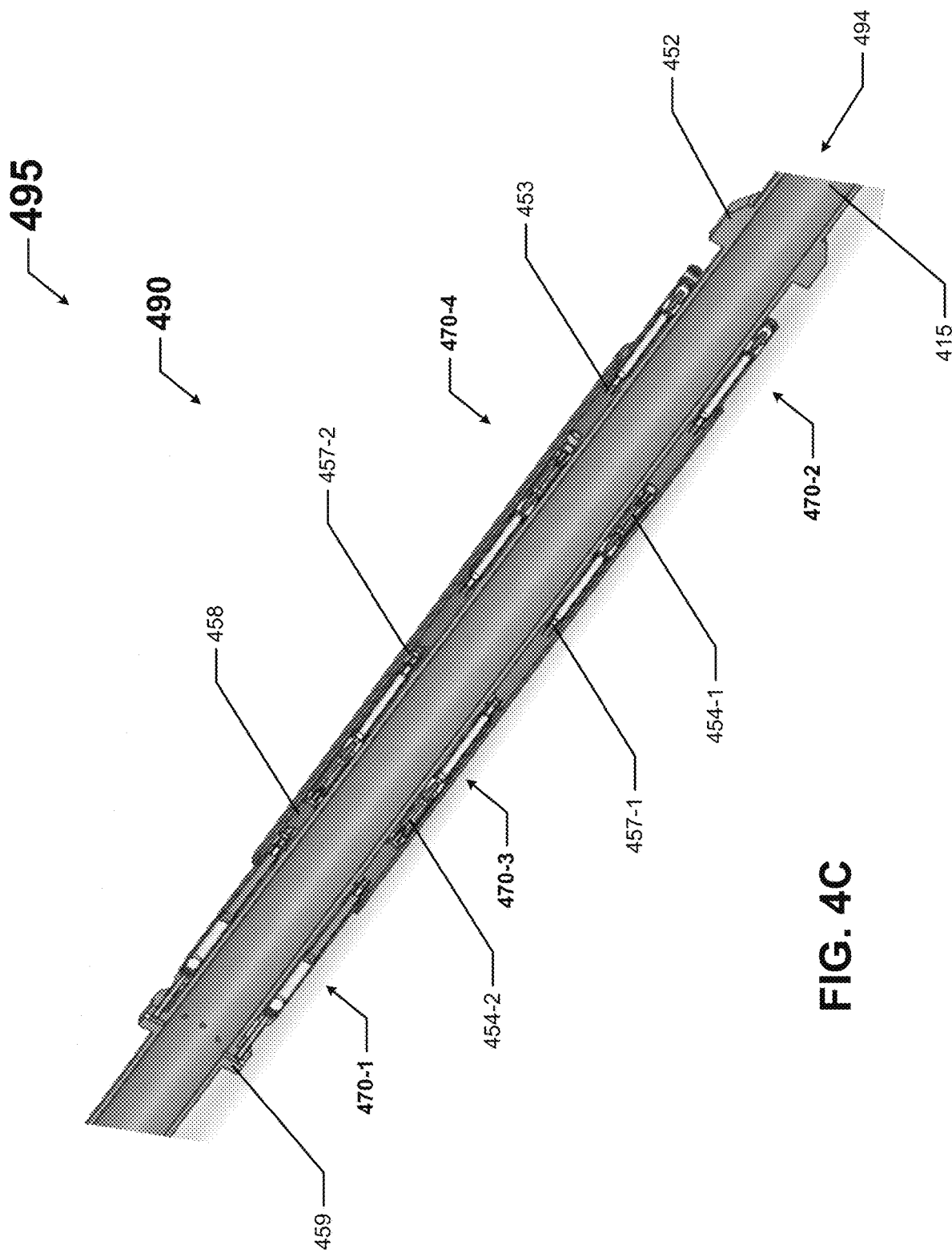

FIGS. 4A through 4C show a downhole on-demand extended-life power source system assembly 495 in accordance with certain example embodiments. Specifically, FIG. 4A shows an isometric view of a power source system assembly 495. FIG. 4B shows an isometric view of the power source system assembly 495 of FIG. 4A without a shroud 403 (a type of housing 403). FIG. 4C shows a cross-sectional side view of a portion of the power source system assembly 495.

Referring to FIGS. 1 through 4C, the power source system assembly 495 of FIGS. 4A through 4C includes a power source system 490 mounted on a specialized tubing housing 415. The tubing housing 415 for this embodiment is designed for a tubing-deployed completion, where the system is deployed as an integral part of the production tubing (e.g., tubing string 114). For example, the tubing housing 415 has an inner surface that forms a cavity 494 that is continuous along the length of the tubing housing 415. In alternative embodiments, something other than tubing housing 415 can be used to accommodate the power source system 490, examples of which can include (but are not limited to) a casing pipe (e.g., casing pipe 125), a drill string, a wireline, and a coiled tubing deployed system. The primary purpose of the tubing housing 415 and shroud 403 is to provide a downhole housing that encloses, hermetically seals, and protects the components of the power source system 490 from the harsh wellbore environment (e.g., environment 299).

The tubing housing 415 is specialized because it includes, in addition to the standard coupling features 418 (in this case, mating threads) disposed at each end of the tubing housing 415, one or more features that accommodate portions of the power source system 490. For example, protrusion 452 extends radially and uniformly in all directions away from the outer surface of the tubing housing 415 toward the bottom end (in terms of the orientation of the assembly 495 of FIGS. 4A through 4C) of the tubing housing 415. The protrusion 452 can extend at least as far away from the outer surface of the tubing housing 415 as the various cells 470 to help protect those cells 470. While not shown in FIG. 4A, the protrusion 452 can be used to help support the shroud 403, as when the shroud 403 is extended or moved toward the bottom end of the tubing housing 415.

Protrusion 453, located slightly further up the tubing housing 415 relative to protrusion 452, also extends radially and uniformly in all directions away from the outer surface of the tubing housing 415. In this case, in addition to acting as a standoff to support the shroud 403 and/or protect the cells 470, the protrusion 453 is configured to hold an array of cells 470-2 arranged radially around the outer surface of the tubing housing 415 and oriented along the length of the tubing housing 415.

Protrusion 454-1 and protrusion 457-1, located toward the bottom middle of the tubing housing 415 along its length, also extend radially and uniformly in all directions away from the outer surface of the tubing housing 415. In this case, in addition to acting as a standoff to support the shroud 403 and/or protect the cells 470, the protrusion 454-1 and protrusion 457-1 are configured to hold another array of cells 470-4 arranged radially around the outer surface of the tubing housing 415 and oriented along the length of the tubing housing 415. The array of cells 470-4 are configured differently than the array of cells 470-2. In addition, protrusion 454-1 has a number of notches disposed therein and inside of which are disposed the array of cells 470-4. There are also multiple slots 456-1 disposed in protrusion 454-1 and protrusion 457-1 that are aligned with each other.

Protrusion 454-2 and protrusion 457-2, located toward the top middle of the tubing housing 415 along its length, also extend radially and uniformly in all directions away from the outer surface of the tubing housing 415. In this case, in addition to acting as a standoff to support the shroud 403 and/or protect the cells 470, the protrusion 454-2 and protrusion 457-2 are configured to hold another array of cells 470-3 arranged radially around the outer surface of the tubing housing 415 and oriented along the length of the tubing housing 415. The array of cells 470-3 are configured substantially the same as the array of cells 470-4, but they face in opposite directions along the length of the tubing housing 415 relative to each other. In addition, protrusion 454-2 has a number of notches disposed therein and inside of which are disposed the array of cells 470-3. There are also multiple slots 456-2 disposed in protrusion 454-2 and protrusion 457-2 that are aligned with each other.

Protrusion 458 and protrusion 459, located toward the top end of the tubing housing 415 along its length, also extend radially and uniformly in all directions away from the outer surface of the tubing housing 415. In this case, in addition to acting as a standoff to support the shroud 403 and/or protect the cells 470, the protrusion 458 and protrusion 459 are configured to hold another array of cells 470-1 arranged radially around the outer surface of the tubing housing 415 and oriented along the length of the tubing housing 415. The array of cells 470-1 are configured differently than the other array of cells 470-2, 470-3, and 470-4. In addition, there are also multiple slots 456-3 disposed in protrusion 459 in a manner similar to the slots 456 in protrusions 454 and protrusions 457.

These various protrusions (e.g., protrusion 458, protrusion 454-1) can have a number of channels or cavities disposed therein for accommodating electrical wires (a form of communication link 219) and/or other components that can be used to facilitate the generation and transfer of power from a corresponding cell 470 to an electrical load (e.g., electrical load 242). An electrical load can be disposed on another portion of the tubing housing 415, within the cavity 494 of the tubing housing 415, with an adjacent tubing housing, or in some other location.

Figure 5A:
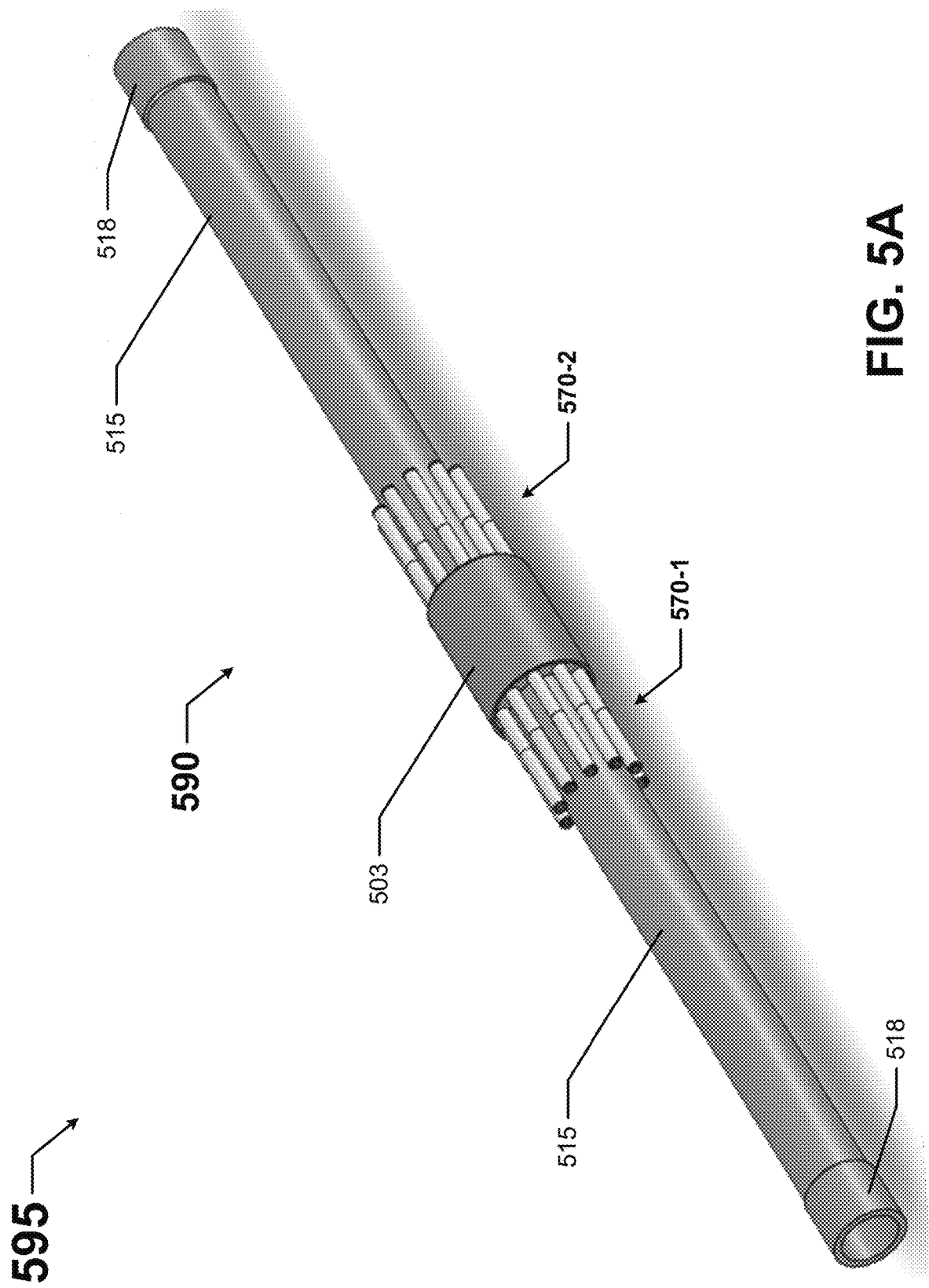
FIGS. 5A through 5C show another downhole on-demand extended-life power source system assembly in accordance with certain example embodiments.
Figure 5B:
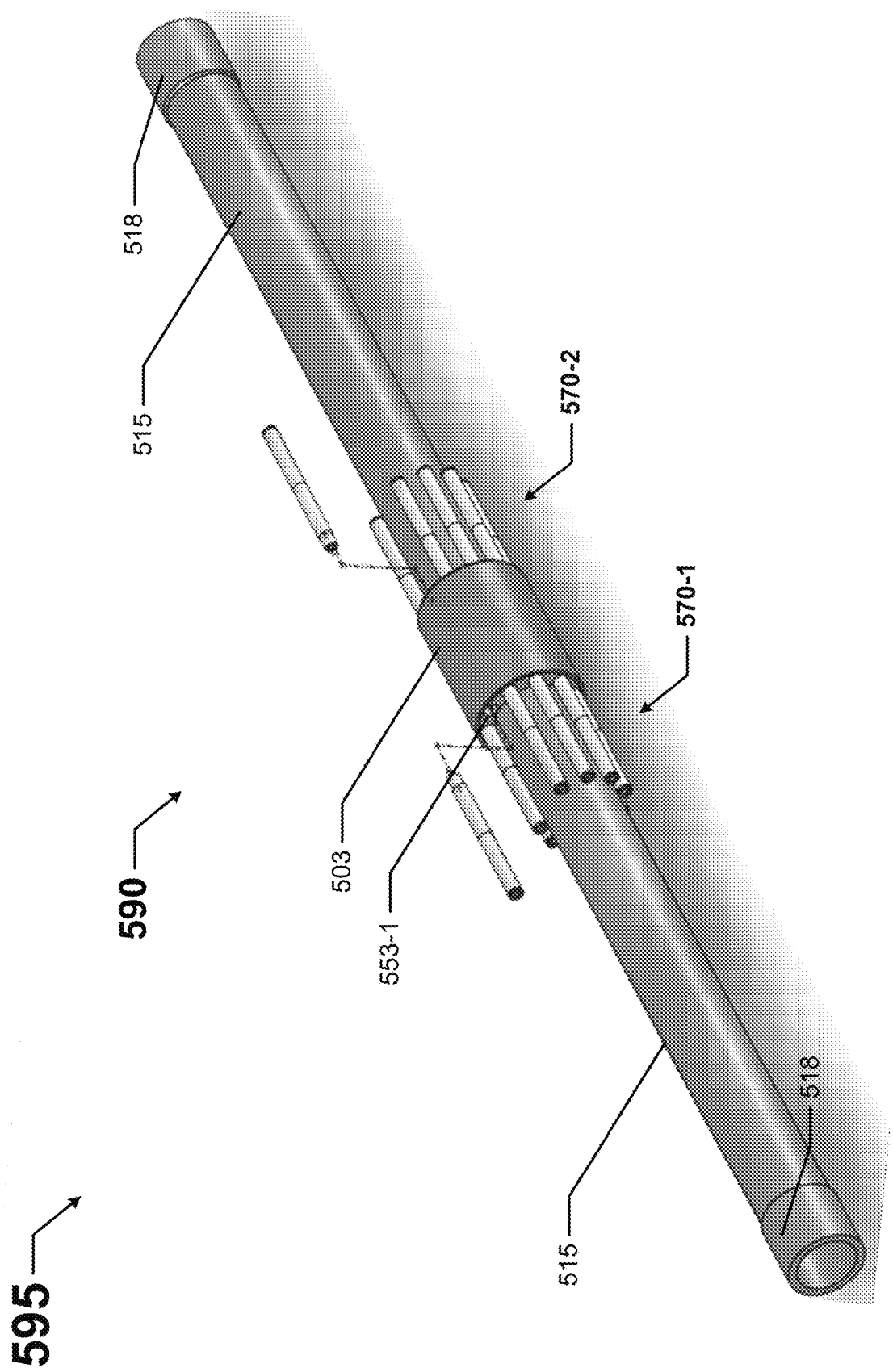
Figure 5C:
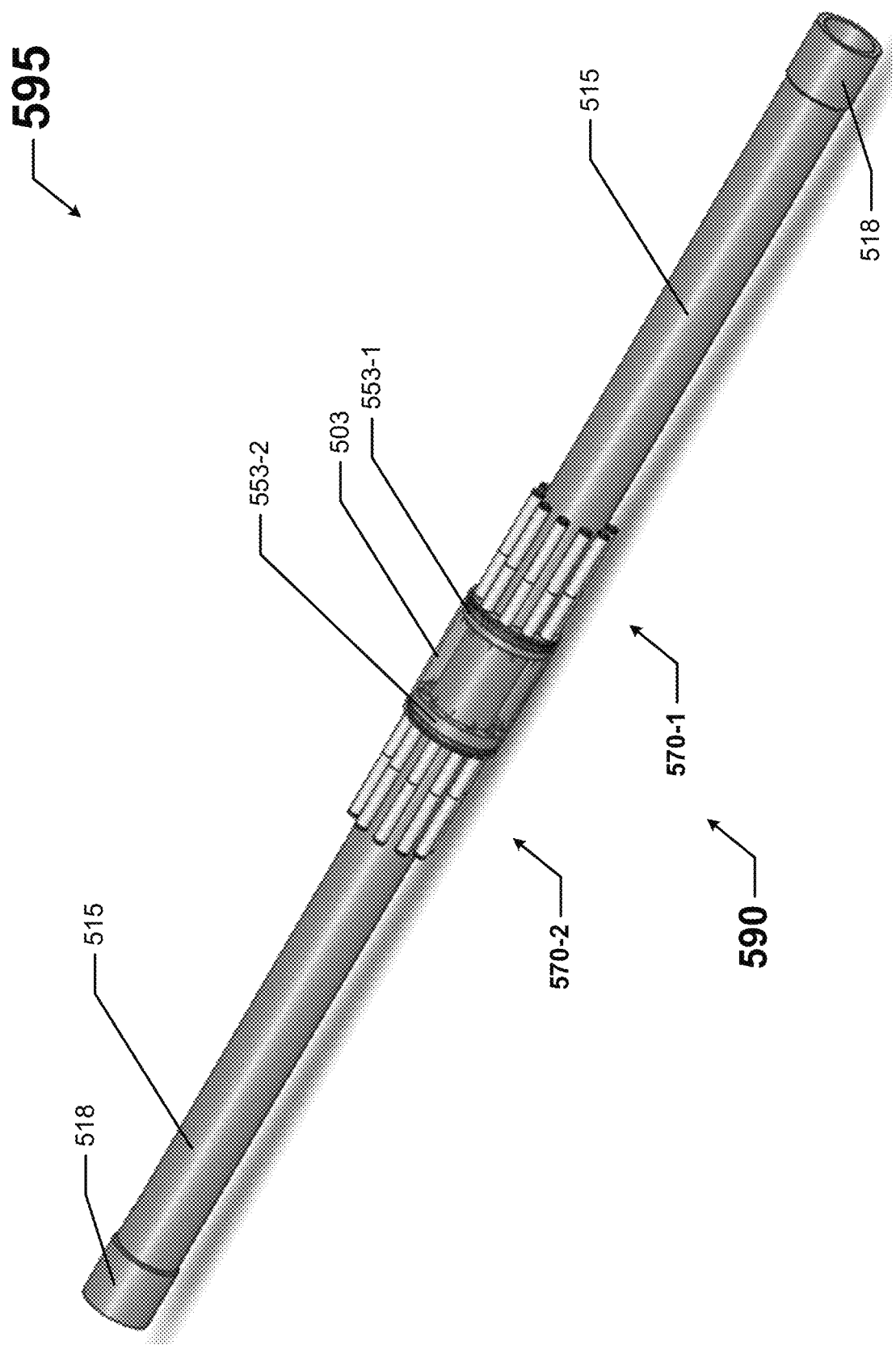

FIGS. 5A through 5C show another downhole on-demand extended-life power source system assembly 595 in accordance with certain example embodiments. Specifically, FIG. 5A shows an isometric view of a power source system assembly 595. FIG. 5B shows a partially-exploded semi-transparent isometric view of the power source system assembly 595. FIG. 5C shows a semi-transparent isometric view of the power source system assembly 595 of FIG. 5A without a shroud 503 (a type of housing 503).

Referring to FIGS. 1 through 5C, the power source system assembly 595 of FIGS. 5A through 5C includes a power source system 590 mounted on a specialized tubing housing 515 that is configured differently than the tubing housing 415 of FIGS. 4A through 4C. The tubing housing 515 for this embodiment is designed for a tubing-deployed completion, where the system is deployed as an integral part of the production tubing (e.g., tubing string 114). For example, the tubing housing 515 has an inner surface that forms a cavity that is continuous along the length of the tubing housing 515.

The tubing housing 515 includes the shroud 503 to provide a downhole housing that encloses, hermetically seals, and protects the components of the power source system 590 from the harsh wellbore environment (e.g., environment 299). The tubing housing 515 is specialized because it includes, in addition to the standard coupling features 518 (in this case, mating threads) disposed at each end of the tubing housing 515, one or more features that accommodate portions of the power source system 590, which in this case includes cell 570-1 and cell 570-2.

There are two identical protrusion 553 (protrusion 553-1 and protrusion 553-2) that are located near the approximate center along the length of the tubing housing 515. Each protrusion 553 extends radially and uniformly in all directions away from the outer surface of the tubing housing 515. In this case, in addition to acting as a standoff to support the shroud 503 and/or protect the cells 570, the protrusions 553 are configured to hold an array of cells 570 arranged radially around the outer surface of the tubing housing 515 and oriented along the length of the tubing housing 515. Specifically, protrusion 553-1 holds the array of cells 570-1, and protrusion 553-2 holds the array of cells 570-2. Protrusion 553-1 and protrusion 553-2 can have a number of channels or cavities disposed therein for accommodating electrical wires (a form of communication link 219) and/or other components that can be used to facilitate the generation and transfer of power from a corresponding cell 570 to an electrical load (e.g., electrical load 242).

Figure 6A:
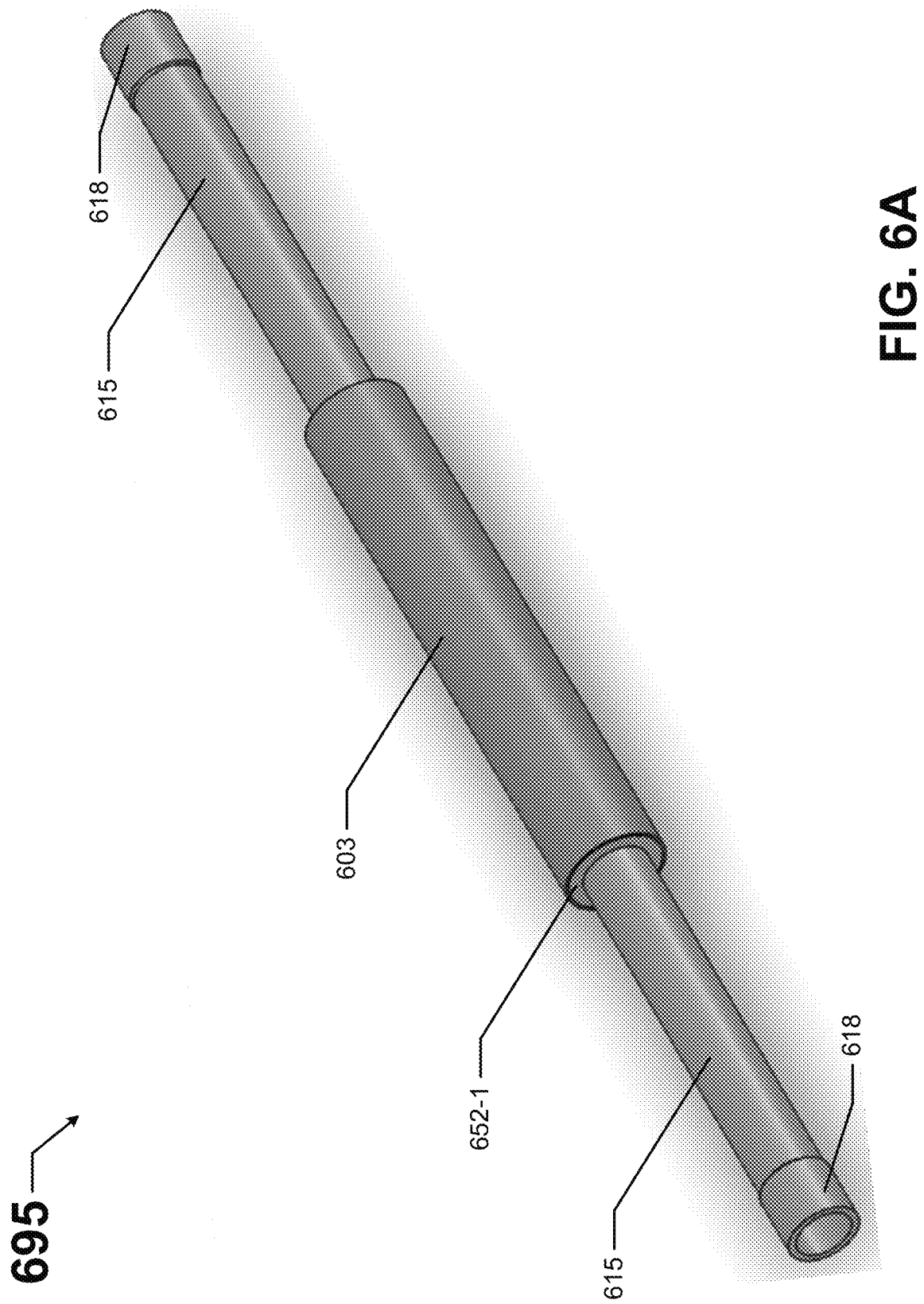
FIGS. 6A through 6C show yet another downhole on-demand extended-life power source system assembly in accordance with certain example embodiments.
Figure 6B:
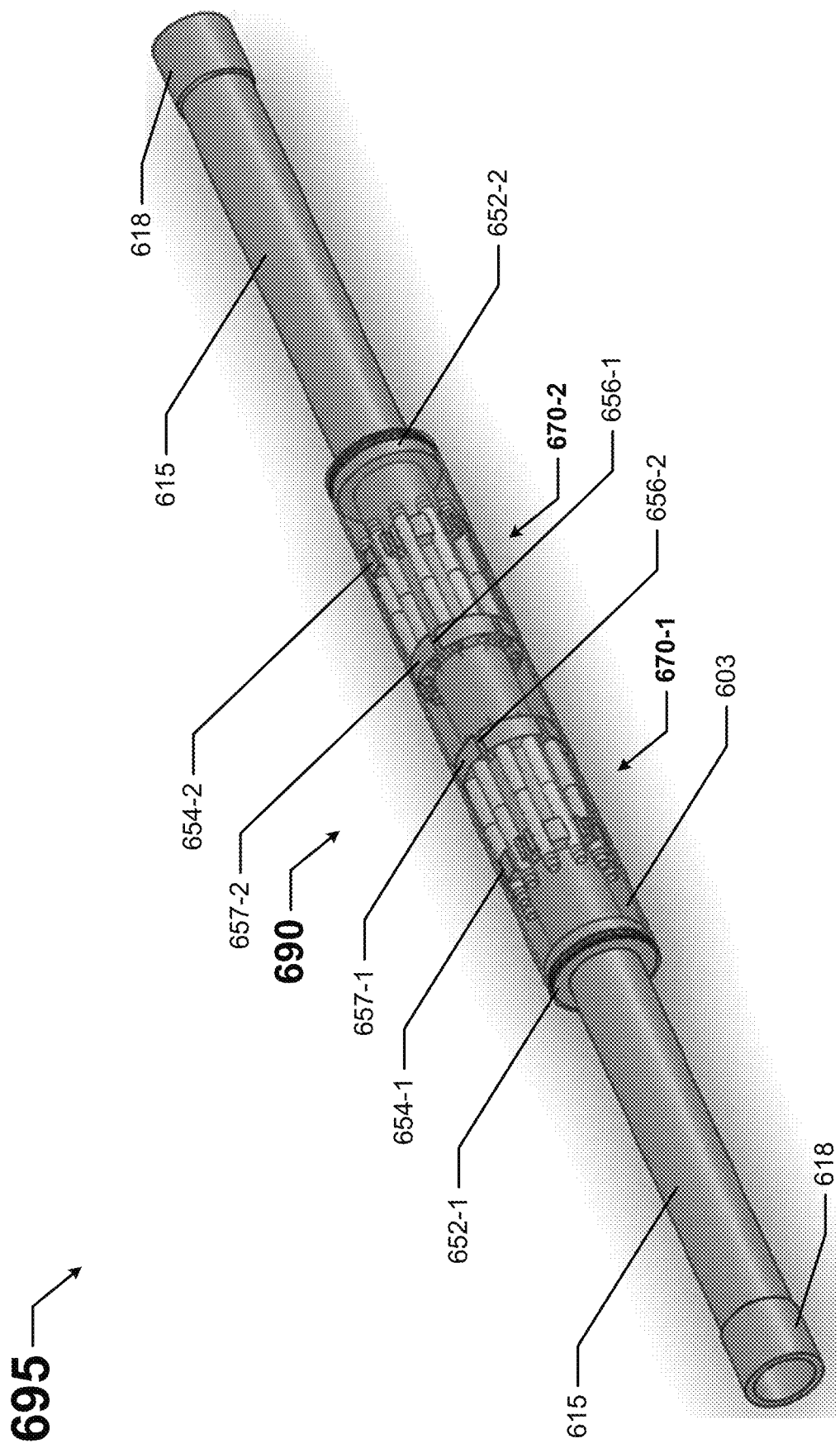
Figure 6C:
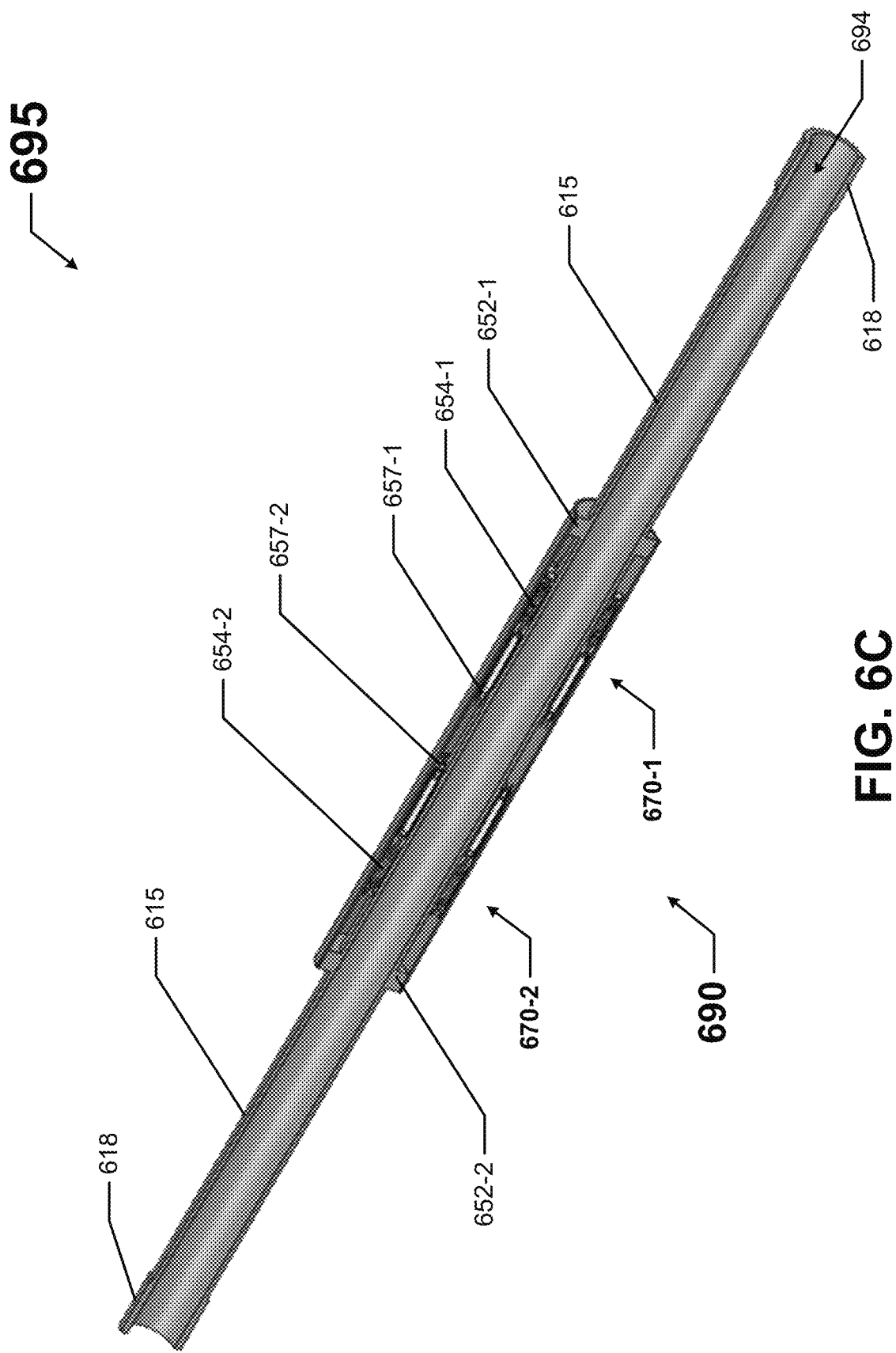

FIGS. 6A through 6C show yet another downhole on-demand extended-life power source system assembly 695 in accordance with certain example embodiments. Specifically, FIG. 6A shows an isometric view of a power source system assembly 695. FIG. 6B shows an isometric view of the power source system assembly 695 of FIG. 6A without a shroud 603 (a type of housing 603). FIG. 6C shows a cross-sectional side view of a portion of the power source system assembly 695.

Referring to FIGS. 1 through 6C, the power source system assembly 695 of FIGS. 6A through 6C includes a power source system 690 mounted on a specialized tubing housing 615. The tubing housing 615 for this embodiment is designed for a tubing-deployed completion, where the system is deployed as an integral part of the production tubing (e.g., tubing string 114). For example, the tubing housing 615 has an inner surface that forms a cavity 694 that is continuous along the length of the tubing housing 615. The tubing housing 615 also includes a shroud 603 that serves as a downhole housing to enclose and protect the components of the power source system 690 from the harsh wellbore environment (e.g., environment 299).

The tubing housing 615 is specialized because it includes, in addition to the standard coupling features 618 (in this case, mating threads) disposed at each end of the tubing housing 615, one or more features that accommodate portions of the power source system 690. These features form mirror images of each other with respect to the middle of the tubing housing 615 along its length. For example, protrusion 652-1 (located toward the bottom end of the tubing housing 615) and protrusion 652-2 (located toward the top end of the tubing housing 615) extends radially and uniformly in all directions away from the outer surface of the tubing housing 615. The protrusions 652 can extend at least as far away from the outer surface of the tubing housing 615 as the two cells 670 to help protect those cells 670. The protrusions 652 can be used to help support the shroud 603.

Protrusion 654-1 and protrusion 657-1, located toward the bottom middle of the tubing housing 615 along its length, also extend radially and uniformly in all directions away from the outer surface of the tubing housing 615. In this case, in addition to acting as a standoff to support the shroud 603 and/or protect the cells 670, the protrusion 654-1 and protrusion 657-1 are configured to hold an array of cells 670-6 arranged radially around the outer surface of the tubing housing 615 and oriented along the length of the tubing housing 615. The array of cells 670-1 are configured similar to the array of cells 470-4 of FIGS. 4A through 4C. In addition, protrusion 654-1 has a number of notches disposed therein and inside of which are disposed the array of cells 670-1. There are also multiple slots 656-1 disposed in protrusion 654-1 and protrusion 657-1 that are aligned with each other.

Continuing with the mirror image arrangement, protrusion 654-2 and protrusion 657-2, located toward the top middle of the tubing housing 615 along its length, also extend radially and uniformly in all directions away from the outer surface of the tubing housing 615. In this case, in addition to acting as a standoff to support the shroud 603 and/or protect the cells 670, the protrusion 654-2 and protrusion 657-2 are configured to hold another array of cells 670-2 arranged radially around the outer surface of the tubing housing 615 and oriented along the length of the tubing housing 615. The array of cells 670-2 are configured substantially the same as the array of cells 670-1, but they face in opposite directions along the length of the tubing housing 615 relative to each other. In addition, protrusion 654-2 has a number of notches disposed therein and inside of which are disposed the array of cells 670-2. There are also multiple slots 656-2 disposed in protrusion 654-2 and protrusion 657-2 that are aligned with each other.

These various protrusions (e.g., protrusion 652-1, protrusion 657-2) can have a number of channels or cavities disposed therein for accommodating electrical wires (a form of communication link 219) and/or other components that can be used to facilitate the generation and transfer of power from a corresponding cell 670 to an electrical load (e.g., electrical load 242).

Figure 7:
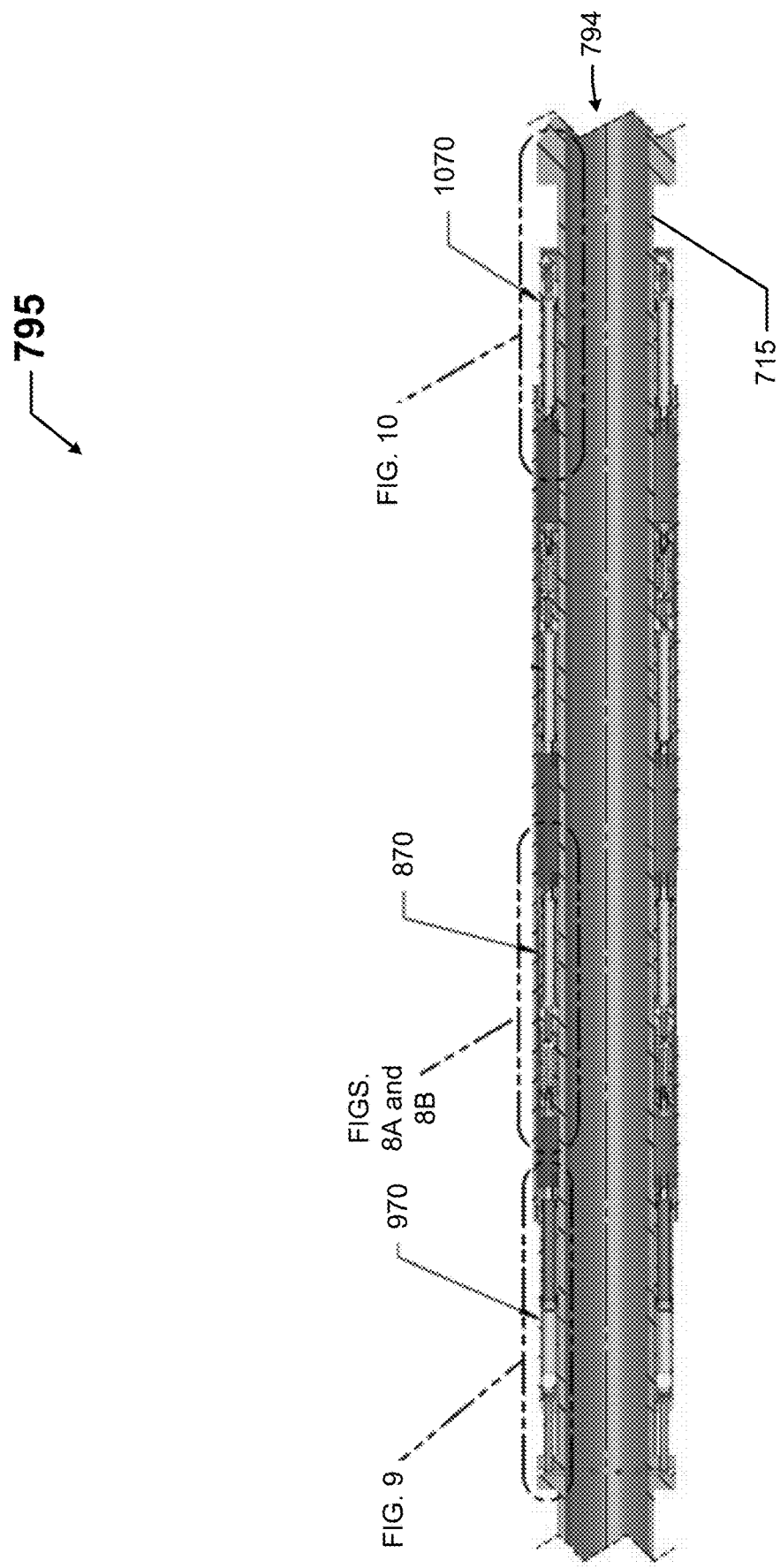
FIG. 7 shows a cross-sectional side view of part of a downhole on-demand extended-life power source system assembly in accordance with certain example embodiments.
Figure 8A:
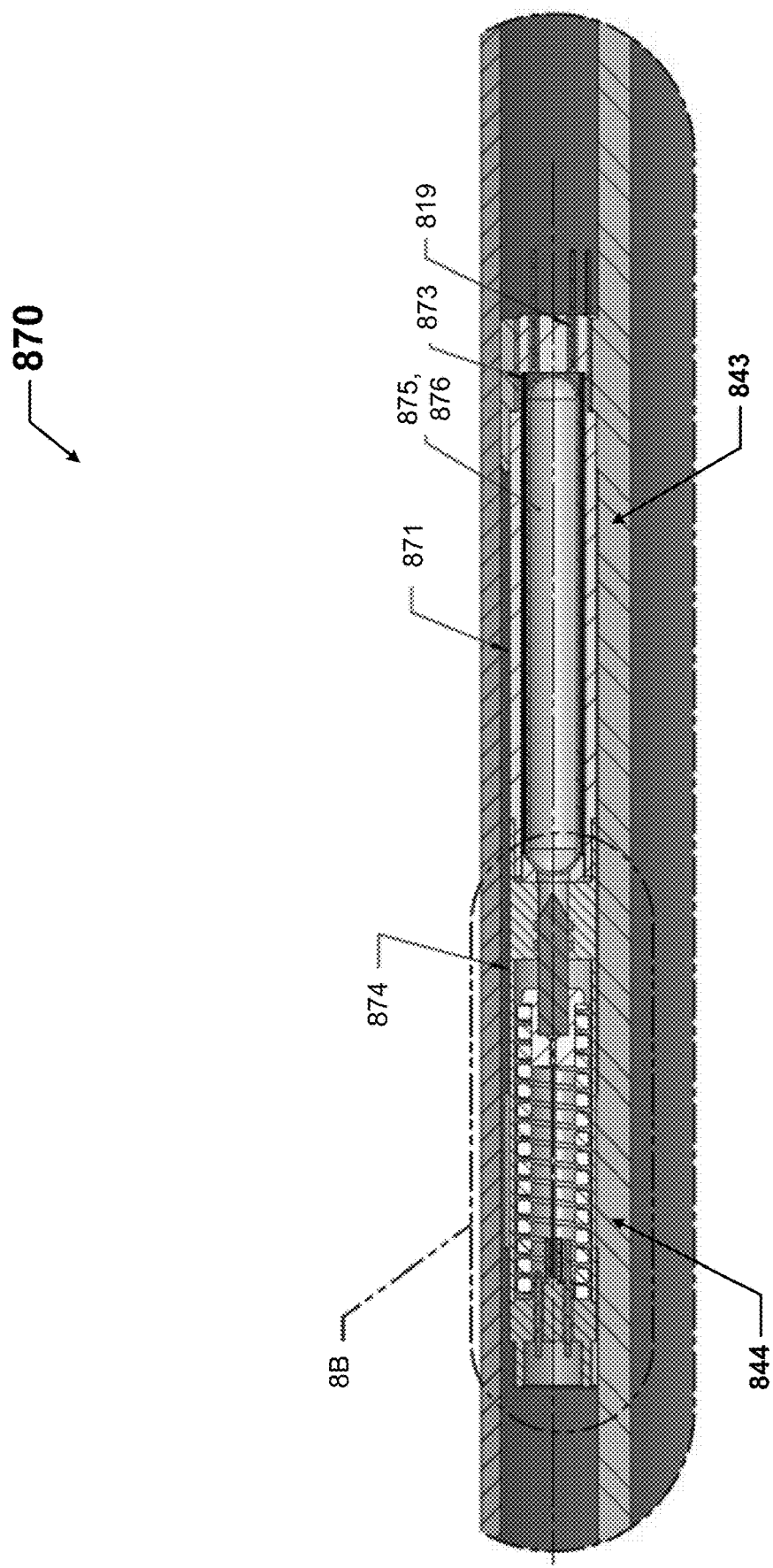
FIGS. 8A and 8B show a cell of the downhole on-demand extended-life power source system assembly of FIG. 7 in accordance with certain example embodiments.
Figure 8B:
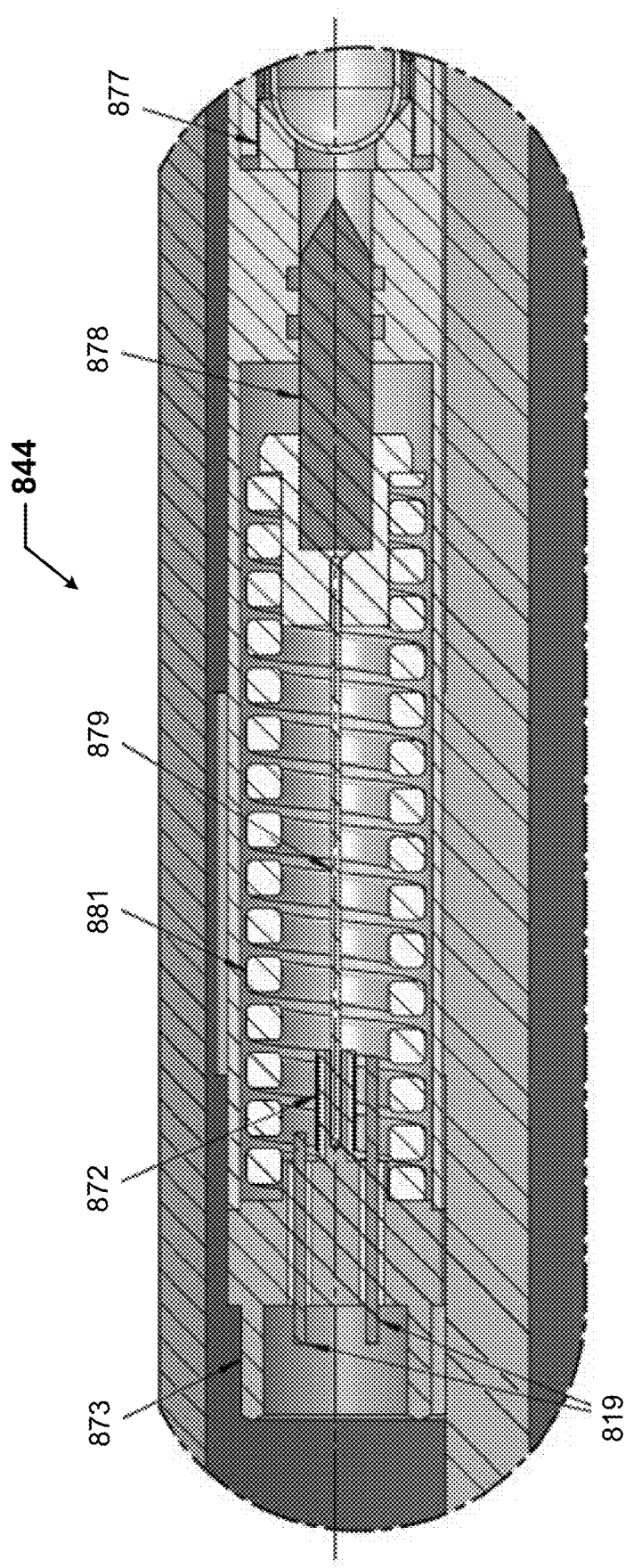
Figure 9:
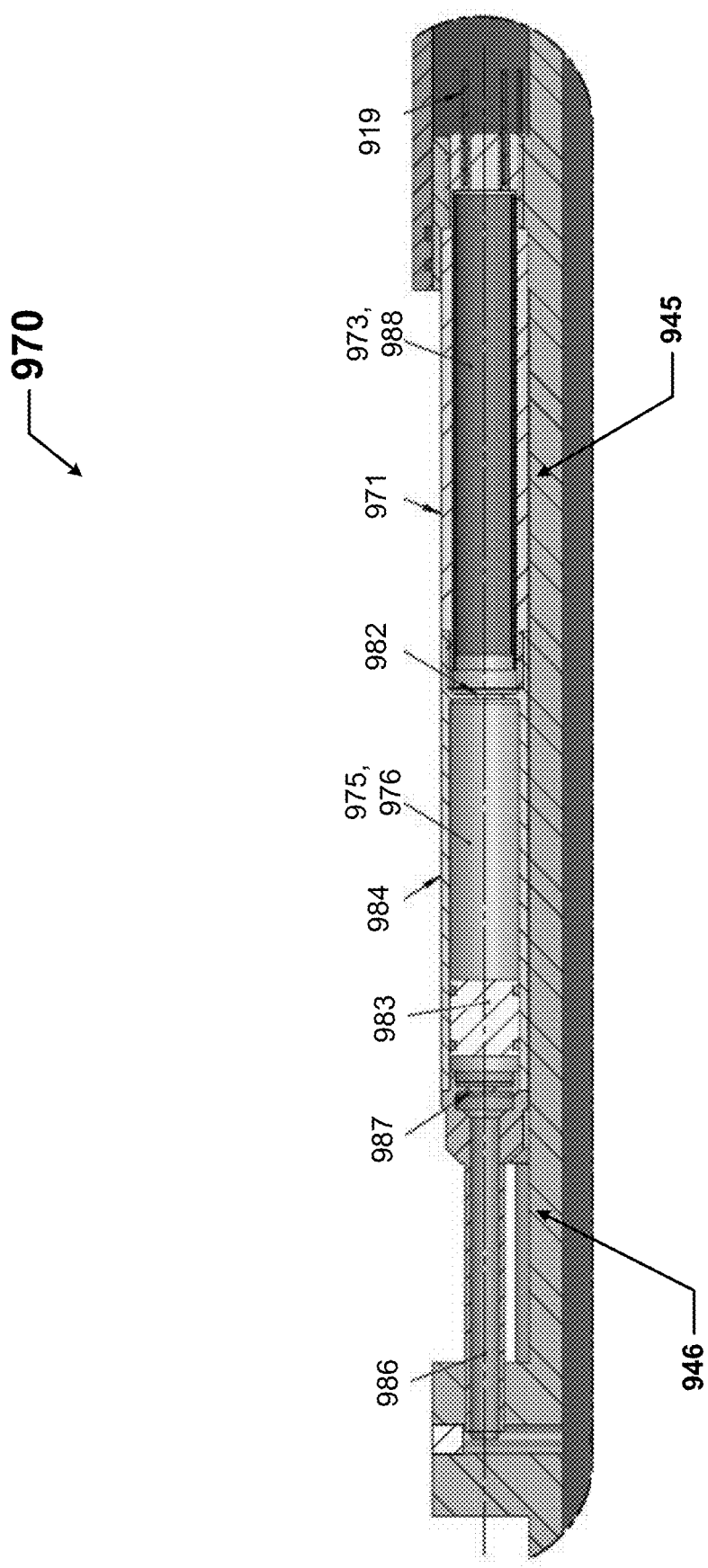
FIG. 9 shows another cell of the downhole on-demand extended-life power source system assembly of FIG. 7 in accordance with certain example embodiments.
Figure 10:
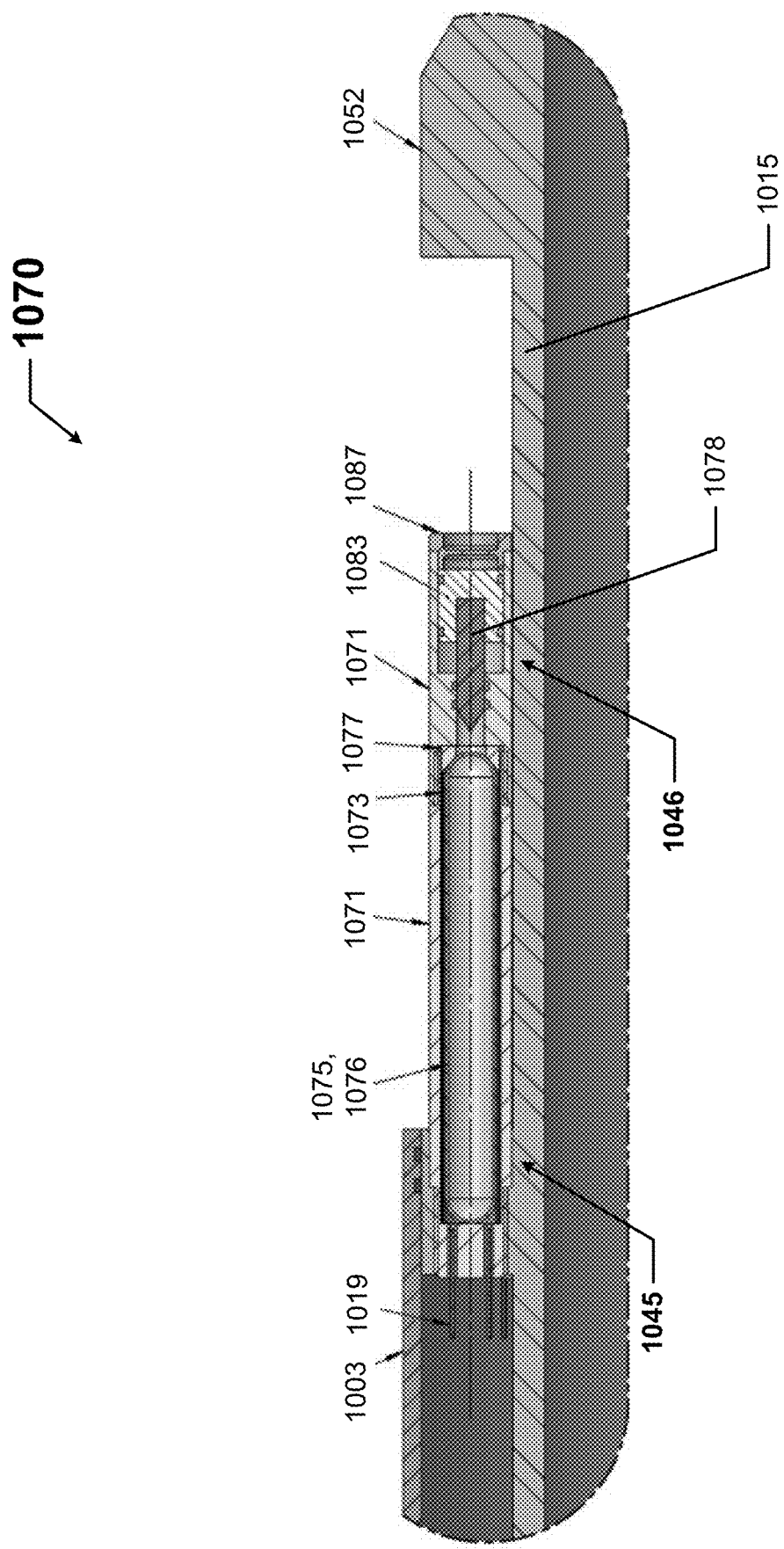
FIG. 10 shows yet another cell of the downhole on-demand extended-life power source system assembly of FIG. 7 in accordance with certain example embodiments.

FIG. 7 shows a cross-sectional side view of part of a downhole on-demand extended-life power source system assembly 795 in accordance with certain example embodiments. FIGS. 8A and 8B show a cell 870 of the downhole on-demand extended-life power source system assembly 795 of FIG. 7 in accordance with certain example embodiments. FIG. 9 shows another cell 970 of the downhole on-demand extended-life power source system assembly 795 of FIG. 7 in accordance with certain example embodiments. FIG. 10 shows yet another cell 1070 of the downhole on-demand extended-life power source system assembly 795 of FIG. 7 in accordance with certain example embodiments.

Referring to FIGS. 1 through 10, cell 870, cell 970, and cell 1070 of the power source system assembly 795 of FIG. 7 are integrated with a tubing housing 715 that forms a cavity 794 along its length. Each of the cells (cell 870, cell 970, and cell 1070) can be held in place by one or more protrusions (such as the protrusions discussed above with respect to FIGS. 4A through 6C) and/or one or more other features of the power source system assembly 795. Such protrusions and/or other features can include a number of channels or cavities for accommodating electrical wires (a form of communication link 219) and/or other components that can be used to facilitate the generation and transfer of power from a corresponding cell to an electrical load (e.g., electrical load 242).

FIGS. 8A and 8B show cross-sectional side views of part of cell 870. Specifically, FIG. 8A shows a cross-sectional side view of an electrical trigger 844 and an on-demand energy storage device 844. FIG. 8B shows a more detailed cross-sectional side view of the electrical trigger 844. In this case, the on-demand energy storage device 844 is in the inactive state. In other words, the various components of the on-demand energy storage device 844 are separated from each other.

The on-demand energy storage device 844 of the cell 870 of FIGS. 8A and 8B includes a housing 871 that contains a solid component 873 of the on-demand energy storage device 844. In this design, the solid component 873 includes a lithium anode, separator, and carbon cathode. In alternative embodiments the solid redox components 873 can include various other alternative anodes, cathodes, and separators in a similar configuration. These solid redox components 873 are configured as in typical bobbin, moderate-rate or spirally-wound commercial batteries.

The on-demand energy storage device 844 of the cell 870 also includes a container 875 disposed within the housing 871. The container 875 can be used to house another redox component 876 in liquid form. In this embodiment, the liquid redox component 876 disposed in the container 875 while the on-demand energy storage device 844 is in the inactive state is a liquid cathode, such as Thionyl Chloride. Other examples of the liquid redox component 876 can be other liquid cathodes, electrolytes, or anodes, and function in a similar manner. The container 875 acts as a storage vessel and prevents the contained liquid component 876 from reacting or mixing with the additional redox components (e.g., solid component 873) until the on-demand energy storage device 844 of the cell 870 becomes activated.

The container 875 can have any of a number of configurations and be made of any of a number of materials. For example, the container 875 can be an ampule made of glass or some other breakable or puncturable material. In certain example embodiments, the container 875 is secured and protected from shock and vibration loads by using isolation spacers 877. The on-demand energy storage device 844 becomes activated (is capable of providing electricity) when the various chemical components (in this case, liquid component 876 and solid component 873) are mixed with each other.

A trigger (in this case, electrical trigger 844) is used to release one of the chemical components (in this case, liquid component 876) so that it can mix with the remaining chemical components (in this case, solid component 873). An electrical trigger (e.g., electrical trigger 244) can have any of a number of configurations using one or more of any of a number of components. For example, the electrical trigger 844 of FIGS. 8A and 8B includes a compression spring 881 held in compression by a restraining wire 879 within a trigger housing 874. The trigger housing 874 in this case is located adjacent to the container 875 holding the liquid component 876.

When the compression spring 881 is held in compression, it stores mechanical energy. One end of the restraining wire 879 in this example is permanently welded or otherwise coupled to projectile 878 (in this case, a cylindrical carbide punch), and the other end of the restraining wire 879 is coupled (e.g., welded, soldered with eutectic material, brazed) to a retainer 873. For example, a eutectic solder has a specific and precise melting temperature that can be used in the high-temperature and/or high-pressure environment to ensure that the restraining wire 879 is securely coupled to the retainer 873. A eutectic solder with a melting temperature higher than that of the temperature of the environment (e.g., environment 299, such as a subterranean wellbore) is useful to avoid inadvertent or premature activation of the on-demand energy storage device 843.

The electrical trigger 844 also includes a heating element 872 that includes a resistance wire (e.g., nichrome wire) wrapped around a portion of the retainer 873 at location where the restraining wire 879 is coupled to the retainer 873. During activation of the on-demand energy storage device 843, an electrical current is provided (using one or more communication links 819 in the form of connector pins and/or electrical conductors) to the resistance wire of the heating element 872 by the controller (e.g., controller 204).

For example, when a low power condition of an electrical load (e.g., electrical load 242) is sensed (using the energy metering module 211) by the controller 204, the controller 204 instructs the power module 212 to provide an electrical current to the heating element 872 of the electrical trigger 844. The electrical current and resistance in the resistance wire of the heating element 872 causes heating and melting of the eutectic solder joint or other means of coupling the restraining wire 879 and the retainer 873 to each other. When the heat reaches a certain point, the coupling between the restraining wire 879 and the retainer 873 is undone, which causes the restraining wire 879 to stop restraining the compression spring 881. When this occurs, the compression spring 881 is no longer held in compression, and the energy stored in the compression spring 881 causes the compression spring 881 to extend to a normal state. In alternative embodiments, the stored energy can take the form of a pressurized gas, some other energy storage device, or some other form of energy.

In this example, the energy released in the compression spring 881 is imparted onto the projectile 878 and causes the projectile 878 to accelerate towards the breakable container 875. When the compression spring 881 delivers the projectile 878 to the container 875, the projectile 878 breaches the container 875, thereby causing the release of the contents (in this case, the liquid component 876) from the container 875. Alternative embodiments may employ release of the liquid component 876 (or another chemical component of the on-demand energy storage device 843) by various other means, such as direct mechanical actuation or electric (e.g., solenoid) actuation of a valve.

Once the liquid component 876 is released from the container 875, the liquid component 876 encounters and mixes with the solid component 873. When this occurs, the on-demand energy storage device 843 is activated, to provide electrical energy that is transmitted through the communication links 819 (in this case, glass-sealed pin connectors) to one or more of the electrical loads (e.g., electrical loads 242). The electrical trigger 844 of FIGS. 8A and 8B can be dedicated to activating the on-demand energy storage device 843 of FIG. 8A. Alternatively, the electrical trigger 844 of FIGS. 8A and 8B can activate multiple cycle on-demand energy storage devices, one of which is the on-demand energy storage device 843. When the on-demand energy storage device 843 is part of an array, as in FIGS. 4A through 6C, all on-demand energy storage devices in the array can be sequentially activated, providing a long term, electrically activated, on-demand power source to the electrical loads 242.

FIG. 9 shows a cross-sectional side view of cell 970, which includes a mechanical trigger 946 and an on-demand energy storage device 945. The cell 970 of FIG. 9 also includes a housing 971 that contains a container 988 (also called a chamber 988), and within the container 988 can be disposed one or more solid redox components 973. In this design, the solid redox components 973 include lithium, a separator, and a carbon cathode. In alternative embodiments the solid redox components 973 can include various alternative anodes, cathodes, and separators in a similar configuration. These solid redox components 973 are configured as in typical bobbin, moderate rate, or spirally wound commercial batteries.

Also with this design, another container 975 (also called a chamber 975) is disposed in the housing 971 adjacent to container 988. Container 975 houses a liquid redox component 976. In certain example embodiments, container 975 can be an integral cylindrical glass or Teflon lined chamber. Container 988 and container 975 are separated from each other by an actuatable barrier 982. With this design, the liquid redox component 976 disposed within the container 975 is a liquid cathode, such as Thionyl Chloride. In alternative embodiments, the liquid redox component 976 disposed within the chamber 975 can be other liquid cathodes, electrolytes, or anodes that function in a similar manner. The lined chamber 975 acts as an inert container and prevents the liquid redox component 976 from reacting or mixing with the solid redox component 973 disposed within chamber 988 while the on-demand energy storage device 945 is inactive until the mechanical trigger 946 initiates the activation process.

A trigger (in this case, mechanical trigger 946) is used to release one of the chemical components (in this case, liquid component 976) so that it can mix with the remaining chemical components (in this case, solid component 973). A mechanical trigger (e.g., mechanical trigger 246) can have any of a number of configurations using one or more of any of a number of components. For example, the mechanical trigger 946 in this case applies internal tubing pressure to the piston 983 contained within the housing 984 and positioned adjacent to the container 975. Alternative embodiments can utilize compressed air locally stored downhole as the activation mechanism. Pressure is applied to the piston 983 in sufficient quantity to release the outer actuatable barrier seal 987, which is rated higher than the expected pressures experienced in the particular environment in which the cell 970 is placed. The actuatable barrier seal 987 can have various embodiments, including but not limited to a valve, a pressure activated device, or an otherwise energetically activated device. The mechanical trigger 946 in this case is not controlled at all by a controller (e.g., controller 204).

With this system, pressure is applied at the surface (e.g., surface 102), propagated through the wellbore fluids and the tubing pressure port 986. In some alternative embodiments, a tool can be lowered into the wellbore, positioned adjacent to the tubing pressure port 986, and sealed above and below the tubing pressure port 986 to facilitate pressurization if the formation pressure is lower than the rating of the actuatable barrier seal 987. In alternate embodiments, the activation pressure can be applied through the annulus fluids within the tubing string (tubing string 114). As the applied pressure builds, the actuatable barrier seal 987 releases, and subsequently subjects the piston 983 to the applied pressure. The liquid redox components 976 stored within the chamber 975 are in turn compressed, subjecting the actuatable barrier 982 to the applied pressure.

With the applied pressure being sufficiently high, the actuatable barrier 982 is thus also released, allowing the liquid redox components 976 contained within the chamber 975 to flow into chamber 988. When this occurs, the liquid redox components 976 mix with the solid redox components 973, activating the on-demand energy storage device 945. When the on-demand energy storage device 945 is activated, it provides electrical energy via the communication links 919 (in this case, for example, glass hermetically-sealed pin connectors) to the electrical load (e.g., electrical load 242). The actuatable barrier seal 987 and/or the actuatable barrier 982 can have a variety of actuation methods and can therefore be sequentially activated, providing a long term on-demand power source, or failsafe backup.

The mechanical trigger 946 of FIG. 9 can be dedicated to activating the on-demand energy storage device 943 of FIG. 9. Alternatively, the mechanical trigger 946 of FIG. 9 can activate multiple cycle on-demand energy storage devices, one of which is the on-demand energy storage device 943. When the on-demand energy storage device 943 is part of an array, as in FIGS. 4A through 6C, all on-demand energy storage devices in the array can be sequentially activated, providing a long term, electrically activated, on-demand power source to the electrical loads 242.

FIG. 10 shows a cross-sectional side view of cell 1070, which includes a mechanical trigger 1046 and an on-demand energy storage device 1045. The cell 1070 of FIG. 10 also includes a housing 1071 having a chamber, inside of which are disposed the solid redox components 1073 and a breakable container 1075 located adjacent to the solid redox components 1073. In this design, the solid redox components 1073 can include lithium, a separator, and a carbon cathode. In alternative embodiments the solid redox components 1073 can include various alternative anodes, cathodes and separators in a similar configuration. These solid redox components 1073 can be configured as in typical bobbin, moderate rate or spirally wound commercial batteries.

The breakable container 1075 can be made of an inert material and can be filled with the liquid redox components 1076. In this system, the container 1075 can be filled with a liquid cathode, such as thionyl chloride. In alternative embodiments, the container 1075 can be filled with other liquid cathodes, electrolytes or anodes and function in a similar manner. The container 1075 acts as a storage vessel and prevents the liquid redox components 1076 from reacting or mixing with the solid redox components 1073 until the on-demand energy storage device 1045 is activated. The container 1075 is secured and protected from shock and vibration loads by using isolation spacers 1077. The on-demand energy storage device 1044 becomes activated (is capable of providing electricity) when the various chemical components (in this case, one or more liquid components 1076 and the one or more solid components 1073) are mixed with each other.

In this case, the mechanical trigger 1046 is enabled by applying annular pressure to the piston 1083 contained within a chamber of the housing 1071 adjacent to the chamber with the breakable container 1075. The piston 1083 can only be moved when sufficient pressure is applied to the actuatable barrier seal 1087, which can be rated higher than the expected pressures experienced within the environment (e.g., environment 299). In alternative embodiments, such as in a field operation of FIG. 1, pressure can be applied from the surface 102 through the wellbore fluids or tool commuted through the tubing string 114, as described above.

In this case, the actuatable barrier seal 1087 is located in a cavity formed between the outer surface of the tubing housing 1015, protrusion 1052 (similar to protrusion 452 discussed above), and the inner surface of the casing string (not shown in FIG. 10, but similar to casing string 124 in FIG. 1). The shroud 1003 (similar to the shrouds discussed above in FIGS. 4A through 6C) in this case does not overlap with the cavity that exposes the actuatable barrier seal 1087. As the applied pressure builds, the actuatable barrier 1087 releases at the rated pressure, subjecting the piston 1083 to the applied pressure.

This energy in the form of differential pressure is imparted onto the piston 1083, which is equipped with a projectile 1078 (in this case, a cylindrical carbide punch). The movement of the piston 1083 causes the projectile 1078 to accelerate towards the container 1075 with enough energy to cause the container 1075 to fracture or otherwise break. When the container 1075 breaks, the liquid redox components 1076 are released to mix with the solid redox components 1073. When this occurs, the on-demand energy storage device 1045 becomes active and provides electrical energy via the communication links 1019 (in this case, glass hermetically-sealed pin connectors) to the electrical load (e.g., electrical load 242).

The mechanical trigger 1046 of FIG. 10 can be dedicated to activating the on-demand energy storage device 1043 of FIG. 10. Alternatively, the mechanical trigger 1046 of FIG. 10 can activate multiple cycle on-demand energy storage devices, one of which is the on-demand energy storage device 1043. When the on-demand energy storage device 1043 is part of an array, as in FIGS. 4A through 6C, all on-demand energy storage devices in the array can be sequentially activated, providing a long term, electrically activated, on-demand power source to the electrical loads 242.

In one or more example embodiments, one or more on-demand energy storage devices are located in a high-pressure and/or high-temperature environment, such as a subterranean wellbore. These example on-demand energy storage devices are part of one or more cells of an example power source system. Each on-demand energy storage devices is maintained in an inactive state by keeping at least two of the chemical components physically separated from each other until power from the on-demand energy storage devices is required. At that point, one or more triggers can be used to cause the separated redox components to combine, resulting in power provided by the on-demand energy storage devices that were triggered.

A trigger can be electrically-based, mechanically-based, or based on a combination of electrical and mechanical. An electrically-based trigger can be controlled by a controller, which can also monitor the status of other on-demand energy storage devices in a network, as well as the demand required by one or more electrical loads that are fed by the on-demand energy storage devices. In some cases, the on-demand energy storage devices can be recharged while in the high-pressure and/or high-temperature environment, further extending the life of the on-demand energy storage devices.

As a result of example embodiments, the electrical loads located in high-pressure and/or high-temperature environments can be served more reliably and for a longer period of time before the on-demand energy storage devices need to be replaced. Example embodiments can provide real-time monitoring and control of the electrical loads and the on-demand energy storage devices. Using example embodiments described herein can improve communication, costs, and operating efficiency.

Accordingly, many modifications and other embodiments set forth herein will come to mind to one skilled in the art to which example embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A downhole on-demand power source system comprising a tubing housing, the tubing housing comprising:
   an outer surface;
   a first cylindrical protrusion extending from the outer surface and disposed about the tubing housing, the first cylindrical protrusion having a first outer diameter;
   a second cylindrical protrusion extending from the outer surface and disposed about the tubing housing, the second cylindrical protrusion having a second outer diameter;
   a shroud disposed about and forming a cavity between the outer surface, the first cylindrical protrusion, and the second cylindrical protrusion;
   at least one first energy storage device located within a wellbore disposed in a subterranean formation in a first inactive state, the at least one first energy storage device disposed in the cavity and comprising an array of cells arranged radially around the outer surface of the tubing housing and oriented along a length of the tubing housing, the array of cells held in place by the first cylindrical protrusion; and
   at least one first trigger that initiates the at least one first energy storage device from the first inactive state to a first active state by breaking a breakable container containing a liquid compound to introduce the liquid compound to a solid compound,
   wherein the at least one first energy storage device, once initiated, provides a first power to an electrical load disposed in the wellbore proximate to the at least one first energy storage device,
   wherein the at least one first energy storage device, when in the first inactive state, is incapable of providing the first power.

2. The system of claim 1, wherein the liquid compound is an electrolyte.

3. The system of claim 1, wherein the liquid compound and the solid compound are mixed by one of capillary action, active pumping, and centrifugal force.

4. The system of claim 1, further comprising:
   a controller operatively coupled to the at least one first trigger, wherein the controller instructs the at least one first trigger to initiate the at least one first energy storage device.

5. The system of claim 4, wherein the controller is configured to measure a power consumption of the electrical load in real time.

6. The system of claim 4, wherein the controller is configured to measure an amount of first available power of the at least one first energy storage device in real time.

7. The system of claim 6, wherein the controller instructs at least one second trigger to activate at least one second energy storage device when the amount of first available power of the at least one first energy storage device falls below a threshold value.

8. The system of claim 1, further comprising:
   at least one second energy storage device located within the wellbore in a second inactive state,
   wherein the at least one first trigger initiates the at least one second energy storage device from the second inactive state to a second active state,
   wherein the at least one second energy storage device, once initiated, provides a second power to the electrical load,
   wherein the at least one second energy storage device, when in the second inactive state, is incapable of providing the second power.

9. The system of claim 1, further comprising:
   at least one second energy storage device located within the wellbore in a second inactive state; and
   at least one second trigger that initiates the at least one second energy storage device from the second inactive state to a second active state,
   wherein the at least one second energy storage device, once initiated, provides a second power to the electrical load,
   wherein the at least one second energy storage device, when in the second inactive state, is incapable of providing the second power.

10. The system of claim 1, further comprising:
    a controller disposed within the cavity, wherein the controller is operatively coupled to the at least one first trigger, wherein the controller instructs the at least one first trigger to initiate the at least one first energy storage device.

11. The system of claim 1, wherein the housing is integrated with a bottom hole assembly at a distal end of a tubing string.

12. The system of claim 1, wherein at least one second energy storage device comprises a second array of cells arranged around the outer surface at a second location of the housing.

13. The system of claim 1, wherein the at least one first trigger and the at least one first energy storage device are designed to withstand and operate under temperatures that exceed 175° C.

14. The system of claim 1, wherein a first cell of the array of cells comprises:
    the solid compound;
    the liquid compound; and
    the at least one first trigger, the at least one first trigger aligned with the liquid compound, wherein the at least one first trigger comprises a spring, a projectile coupled to the spring, a restraining wire that holds the spring in compression, a eutectic solder joint that anchors the restraining wire, and a heating element wrapped around the eutectic solder joint,
    wherein when the heating element applies heat to the eutectic solder joint the spring is released causing the projectile to rupture the breakable container and causing the liquid compound to react with the solid compound thereby generating a first power.

15. A downhole on-demand power source system comprising a tubing housing, the tubing housing comprising:

an outer surface;
a first cylindrical protrusion extending from the outer surface and disposed about the tubing housing, the first cylindrical protrusion having a first outer diameter;
a second cylindrical protrusion extending from the outer surface and disposed about the tubing housing, the second cylindrical protrusion having a second outer diameter;
a shroud disposed about and forming a cavity between the outer surface, the first cylindrical protrusion, and the second cylindrical protrusion; and
at least one first energy storage device located within a wellbore disposed in a subterranean formation in a first inactive state, the at least one first energy storage device disposed in the cavity and comprising an array of cells arranged radially around the outer surface of the tubing housing and oriented along a length of the tubing housing, the array of cells held in place by the first cylindrical protrusion;
wherein a first cell of the array of cells comprises:
a first solid redox component;
a first liquid redox component separated from the first solid redox component by a first actuatable barrier; and
at least one first trigger that initiates the at least one first energy storage device, the at least one first trigger aligned with the first liquid redox component, wherein the at least one first trigger comprises a piston coupled to a pressure port,
wherein when pressure is applied to the pressure port, the piston pushes the first liquid redox component through the first actuatable barrier causing the first liquid redox component to react with the first solid redox component thereby generating a first power,
wherein the at least one first energy storage device, once initiated, provides the first power to an electrical load disposed in the wellbore proximate to the at least one first energy storage device, and
wherein the at least one first energy storage device, when in the first inactive state, is incapable of providing the first power.

16. A downhole on-demand power source system comprising a tubing housing, the tubing housing comprising:
an outer surface;
a first cylindrical protrusion extending from the outer surface and disposed about the tubing housing, the first cylindrical protrusion having a first outer diameter;
a second cylindrical protrusion extending from the outer surface and disposed about the tubing housing, the second cylindrical protrusion having a second outer diameter;
a shroud disposed about and forming a cavity between the outer surface, the first cylindrical protrusion, and the second cylindrical protrusion; and
at least one first energy storage device located within a wellbore disposed in a subterranean formation in a first inactive state, the at least one first energy storage device disposed in the cavity and comprising an array of cells arranged radially around the outer surface of the tubing housing and oriented along a length of the tubing housing, the array of cells held in place by the first cylindrical protrusion;
wherein a first cell of the array of cells comprises:
a first solid redox component;
a first liquid redox component stored in a first container; and
at least one first trigger that initiates the at least one first energy storage device, the at least one first trigger aligned with the first liquid redox component, wherein the at least one first trigger comprises a piston coupled to a pressure seal located on the outer surface of the tubing housing,
wherein when a threshold pressure is applied to the pressure seal, the piston ruptures the first container causing the first liquid redox component to react with the first solid redox component thereby generating a first power,
wherein the at least one first energy storage device, once initiated, provides the first power to an electrical load disposed in the wellbore proximate to the at least one first energy storage device, and
wherein the at least one first energy storage device, when in the first inactive state, is incapable of providing the first power.

17. A downhole on-demand power source system comprising a tubing housing, the tubing housing comprising:
an outer surface;
a first cylindrical protrusion extending from the outer surface and disposed about the tubing housing, the first cylindrical protrusion having a first outer diameter;
a second cylindrical protrusion extending from the outer surface and disposed about the tubing housing, the second cylindrical protrusion having a second outer diameter;
a third protrusion, the third protrusion comprising a first outer diameter and a tapered end, wherein the tapered end has a smaller diameter than the first outer diameter and is disposed closer to a first tubing end than the first outer diameter;
a shroud disposed about and forming a cavity between the outer surface, the first cylindrical protrusion, and the second cylindrical protrusion;
at least one first energy storage device located within a wellbore disposed in a subterranean formation in a first inactive state, the at least one first energy storage device disposed in the cavity and comprising an array of cells arranged radially around the outer surface of the tubing housing and oriented along a length of the tubing housing, the array of cells held in place by the first cylindrical protrusion; and
at least one first trigger that initiates the at least one first energy storage device from the first inactive state to a first active state,
wherein the at least one first energy storage device, once initiated, provides a first power to an electrical load disposed in the wellbore proximate to the at least one first energy storage device, and
wherein the at least one first energy storage device, when in the first inactive state, is incapable of providing the first power.

* * * * *